US011882641B2

(12) United States Patent
Kim et al.

(10) Patent No.: US 11,882,641 B2
(45) Date of Patent: Jan. 23, 2024

(54) INDUCTION HEATING TYPE COOKTOP

(71) Applicant: LG Electronics Inc., Seoul (KR)

(72) Inventors: Seongjun Kim, Seoul (KR); Wontae Kim, Seoul (KR); Seonghoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 16/902,439

(22) Filed: Jun. 16, 2020

(65) Prior Publication Data

US 2021/0259067 A1 Aug. 19, 2021

(30) Foreign Application Priority Data

Feb. 19, 2020 (KR) ........................ 10-2020-0020477

(51) Int. Cl.
*H05B 6/12* (2006.01)
*F24C 7/08* (2006.01)
*H05B 6/06* (2006.01)

(52) U.S. Cl.
CPC ........... *H05B 6/1263* (2013.01); *F24C 7/083* (2013.01); *H05B 6/062* (2013.01); *H05B 6/1209* (2013.01)

(58) Field of Classification Search
CPC .. H05B 6/062; H05B 6/1263; H05B 2206/02; H05B 6/1209; F24C 7/083
See application file for complete search history.

(56) References Cited

U.S. PATENT DOCUMENTS

2012/0138596 A1* 6/2012 Alonso Esteban ..... C03C 17/36 219/600
2017/0142780 A1* 5/2017 Hoare .................... H05B 6/062
2018/0376545 A1* 12/2018 Hwangbo ................ H05B 6/12
2019/0223263 A1* 7/2019 Park ......................... H05B 6/42
2019/0268979 A1* 8/2019 Kim ....................... H05B 6/062
2020/0100332 A1* 3/2020 Inoshita ............... H05B 6/6455
2020/0163169 A1* 5/2020 Jeong ................... H05B 6/1272
2021/0259067 A1* 8/2021 Kim ........................ F24C 7/083

FOREIGN PATENT DOCUMENTS

DE 10127051 12/2002
JP 10214680 A * 8/1998
JP H10214680 8/1998

(Continued)

OTHER PUBLICATIONS

EP extended European search report, in European Appln. No. 20179963.2, dated Nov. 19, 2020, 10 pages.

(Continued)

*Primary Examiner* — Dana Ross
*Assistant Examiner* — Kuangyue Chen
(74) *Attorney, Agent, or Firm* — Fish & Richardson P.C.

(57) ABSTRACT

An induction heating type cooktop include a case, a cover plate connected to an upper end of the case, the cover plate having an upper surface configured to support thereon an object to be heated, a thin layer disposed at the cover plate, a heat insulator disposed vertically below the thin layer, a working coil disposed inside the case, a cooling fan configured to blow air toward the working coil, and a bracket that defines a cooling passage. The cooling passage is configured to guide the air to pass through the working coil and to discharge the air to an outside of the bracket.

22 Claims, 17 Drawing Sheets

(56) References Cited

FOREIGN PATENT DOCUMENTS

| | | | | | |
|---|---|---|---|---|---|
| JP | 2005141962 | | | 6/2005 | |
| JP | 2007200752 | | | 8/2007 | |
| JP | 2007200752 | A | * | 8/2007 | |
| JP | 2008226573 | | | 9/2008 | |
| JP | 2008226573 | A | * | 9/2008 | ............. H05B 6/062 |
| JP | 2012178369 | | | 9/2012 | |
| JP | 5630495 | | | 11/2014 | |
| JP | 6441910 | | | 12/2018 | |
| KR | 100253234 | | | 4/2000 | |

OTHER PUBLICATIONS

PCT International Search Report and Written Opinion in International Appln. No. PCT/KR2020/005206, dated Nov. 30, 2020, 9 pages.

* cited by examiner

INDUCTION HEATING TYPE COOKTOP

CROSS-REFERENCE TO RELATED APPLICATIONS

This application claims priority under 35 U.S.C. 119 and 365 to Korean Patent Application No. 10-2020-0020477, filed on Feb. 19, 2020, the disclosure of which is incorporated herein by reference.

TECHNICAL FIELD

The present disclosure relates to an induction heating type cooktop.

BACKGROUND

Various types of cooking devices are used to heat food in homes or restaurants. For example, gas stoves may use gas as a fuel. In some cases, a cooking device may heat an object such as a cooking container (e.g., a pot) by electricity without using gas.

A method for heating an object by using electricity may be divided into a resistance heating method and an induction heating method. In the resistance heating method, an object may be heated by heat that is generated by a current flowing through a metal resistance wire or a non-metal heating element such as silicon carbide, and then transferred to the object (e.g., a cooking container) through radiation or conduction. In the induction heating method, an object may be heated by an eddy current flowing through the object made of a metal component. The eddy current may be generated in the object by a magnetic field around a coil in response to predetermined radio frequency power applied to the coil.

For instance, the induction heating method may be applied to a cooktop.

In some cases, only a magnetic object may be heated by the induction heating method. For example, when a non-magnetic object (e.g., heat-resistant glass, pottery, etc.) is disposed on the cooktop, the cooktop may not heat the object by induction.

In some cases, an induction heating type cooktop may include a heating plate configured to be heated by an induction heating method to heat a non-magnetic object.

In some cases, the heating plate may not heated above a predetermined temperature, which may deteriorate a heating efficiency. For example, the time taken to heat ingredients contained in an object may be increased. In some cases, where the heating plate is not heated above a predetermined temperature, the cooktop may not include a separate cooling structure for cooling heat in the heating plate.

In some cases, a cooking device may include an electrical conductor to heat an object made of a material having a low permeability.

In some examples, where the thickness of the electrical conductor is greater than the skin depth of the electrical conductor, a magnetic field generated by a coil may not reach the object. Accordingly, a magnetic object may not be directly and inductively heated, which may deteriorate a heating efficiency.

In some cases, a heating plate and an electrical conductor may not be heated above a predetermined temperature. In some cases, a container may be directly and inductively heated. In these cases, the object may not be heated above an arbitrary temperature (e.g., 300° C. or more).

In some cases, where a heating plate or an electrical conductor is heated above a predetermined temperature to generate high temperature heat, the high temperature heat may be transferred to other components in the cooktop such as a working coil and an upper plate. In some cases, the components that receive the high temperature heat may malfunction or get damaged. For instance, when the working coil is exposed to heat of a critical temperature (e.g., about 200° C.) or higher, a chance of damage may increase.

SUMMARY

The present disclosure describes an induction heating type cooktop.

In more detail, the present disclosure describes an induction heating type cooktop that may heat an object regardless of the type of the object and that may have a high heating efficiency.

The present disclosure also describes an induction heating type cooktop designed such that when an object is a magnetic object, most of an eddy current is applied to the object such that a working coil directly heats the object. When the object is a non-magnetic object, the working coil may indirectly heat the object.

The present disclosure further describes an induction heating type cooktop that may minimize a temperature rise of internal components such as a working coil due to high temperature heat.

According to one aspect of the subject matter described in this application, an induction heating type cooktop include a case, a cover plate connected to an upper end of the case, the cover plate having an upper surface configured to support thereon an object to be heated, a thin layer disposed at the cover plate, a heat insulator disposed vertically below the thin layer, a working coil disposed inside the case, a cooling fan configured to blow air toward the working coil, and a bracket that defines a cooling passage. The cooling passage is configured to guide the air to pass through the working coil and to discharge the air to an outside of the bracket.

Implementations according to this aspect may include one or more of the following features. For example, the heat insulator may be disposed on the bracket. In some implementations, the bracket may include a guide part that is configured to fix the heat insulator to the bracket and to restrict movement of the heat insulator in a horizontal direction.

In some implementations, the guide part may include a plurality of guide members that are spaced apart from one another and that are arranged along a circumferential direction of the bracket, and the cooling passage may include a cooling passage outlet that is defined between two of the plurality of guide members and configured to discharge the air through the cooling passage.

In some implementations, the induction heating type cooktop may further include a working coil supporter, the working coil being wound around the working coil supporter, and a base plate that supports the working coil supporter, where the cooling passage has a cooling passage inlet that is defined between the working coil supporter and the base plate and that is configured to receive the air blown by the cooling fan. In some examples, the working coil supporter may define an air space configured to receive the air passing through the cooling passage inlet. In some examples, a gap is defined between the bracket and the working coil, and the gap may be configured to receive the air passing through the air space of the working coil supporter.

In some implementations, the bracket may define a cooling passage outlet configured to discharge the air passing through the gap to the outside of the bracket. In some examples, the bracket may further define a connection hole that is in communication with the cooling passage outlet. In some implementations, the bracket defines at least one through-hole configured to discharge heat from the thin layer.

In some implementations, the induction heating type cooktop may further include a temperature sensor that is disposed at the bracket and configured to sense a temperature of the thin layer.

In some implementations, the induction heating type cooktop may include a temperature sensor configured to sense a temperature of the cover plate or the thin layer, and the bracket may define at least one sensor hole that receives the temperature sensor. In some examples, the heat insulator may define a sensing hole, where at least a portion of the sensing hole overlaps with the at least one sensor hole in a horizontal direction.

In some implementations, the induction heating type cooktop may include a first temperature sensor configured to sense a temperature of the cover plate, and the bracket may define a first sensor hole that is disposed at a center of the bracket and that receives the first temperature sensor, where the thin layer may be coated on an area of the cover plate corresponding to an outside region of the first sensor hole in the bracket.

In some implementations, the induction heating type cooktop may further include a second temperature sensor configured to sense a temperature of the thin layer. The bracket may further define a second sensor hole that receives the second temperature sensor, and the thin layer may be coated on an area of the cover plate corresponding to the second sensor hole in the bracket.

In some implementations, the bracket may include an inner member that defines a first sensor hole, a middle member that is disposed outward relative to the inner member and that defines a second sensor hole, an outer member that is disposed outward relative to the middle member, an inner bridge that connects the inner member to the middle member, and an outer bridge that connects the middle member to the outer member. At least one of the inner bridge or the outer bridge may define a through-hole. In some examples, the inner bridge may include a plurality of bridge members that connect the inner member to the middle member, and the through-hole may be defined between two of the plurality of bridge members.

In some implementations, the induction heating type cooktop may further include a working coil supporter, where the working coil is wound around the working coil supporter, and the bracket is disposed between the working coil supporter and the heat insulator.

In some implementations, a thickness of the thin layer may be less than a skin depth of the thin layer.

In some implementations, the working coil may be configured to, based on a magnetic object being disposed on the upper surface of the cover plate, apply current through a first equivalent circuit including a resistor component of the magnetic object, an inductor component of the magnetic object, a resistor component of the thin layer, and an inductor component of the thin layer. The working coil may be further configured to, based on a nonmagnetic object being disposed on the upper surface of the cover plate, apply current through a second equivalent circuit including the resistor component of the thin layer and the inductor component of the thin layer, the resistor component of the thin layer and the inductor component of the thin layer define an electrical impedance in the thin layer In some implementations, a magnetic object may be heated by an eddy current induced by a magnetic field generated by a working coil, and a non-magnetic object may be heated by a thin layer in which an eddy current is induced by the magnetic field generated by the working coil. Therefore, both the magnetic object and the non-magnetic object may be heated while minimizing a loss of heating efficiency.

In some implementations, the induction heating type cooktop may minimize loss of heating efficiency by directly heating a magnetic object and indirectly heating a non-magnetic object through a thin layer.

In some implementations, the induction heating type cooktop defines a cooling passage that forcibly discharges heat around the working coil, which may minimize the output loss of the working coil due to high temperature heat and the damage to internal components such as the working coil.

In addition to the above-described effects, additional effects of the present disclosure will be described together while explaining specific details for carrying out the present disclosure.

DETAILED DESCRIPTION

Figure 1:
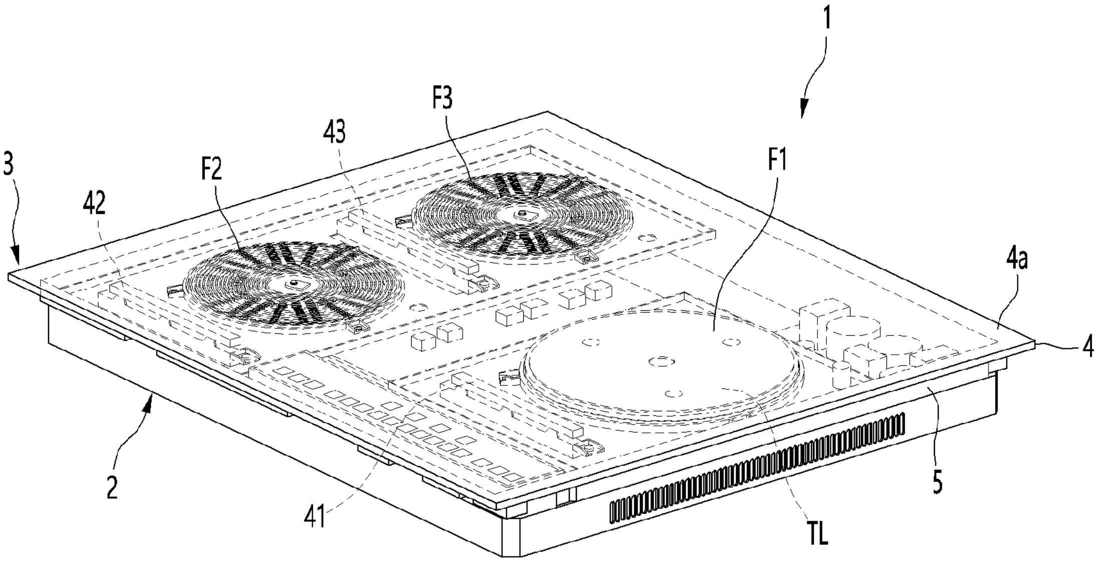
FIG. 1 is a perspective view showing an example of an induction heating type cooktop.

Hereinafter, exemplary implementations of the present disclosure will be described in detail with reference to the accompanying drawings. In the drawings, the same reference numerals are used to indicate the same or similar components.

Hereinafter, one or more examples of an induction heating type cooktop will be described.

Figure 2:
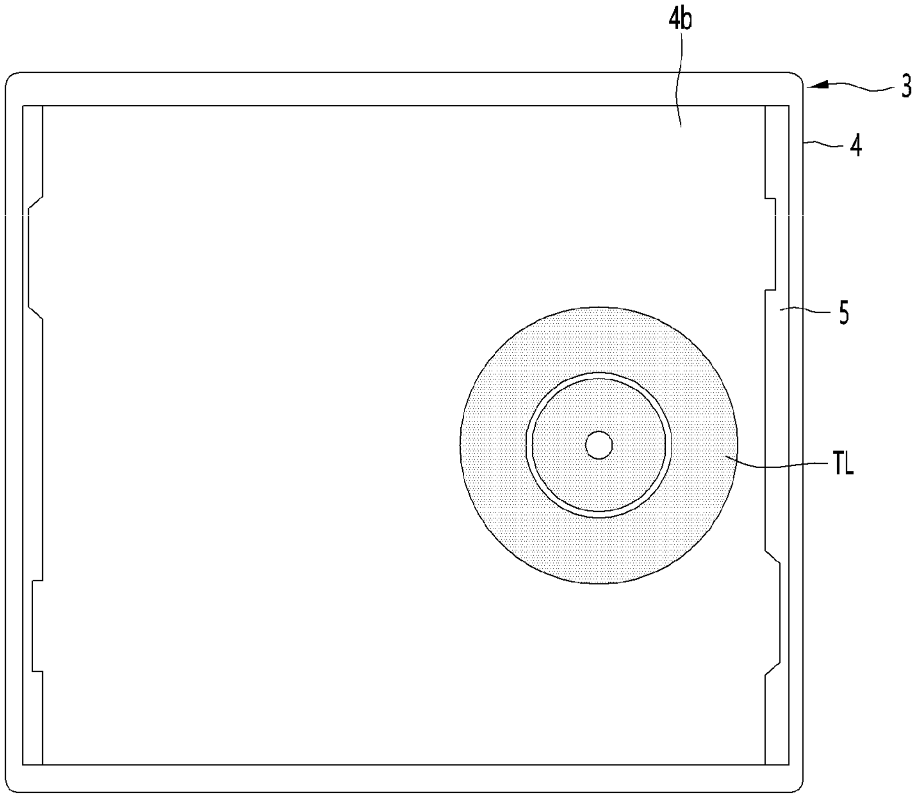
FIG. 2 is a view showing an example of a bottom surface of a cover plate shown in FIG. 1.
Figure 3:
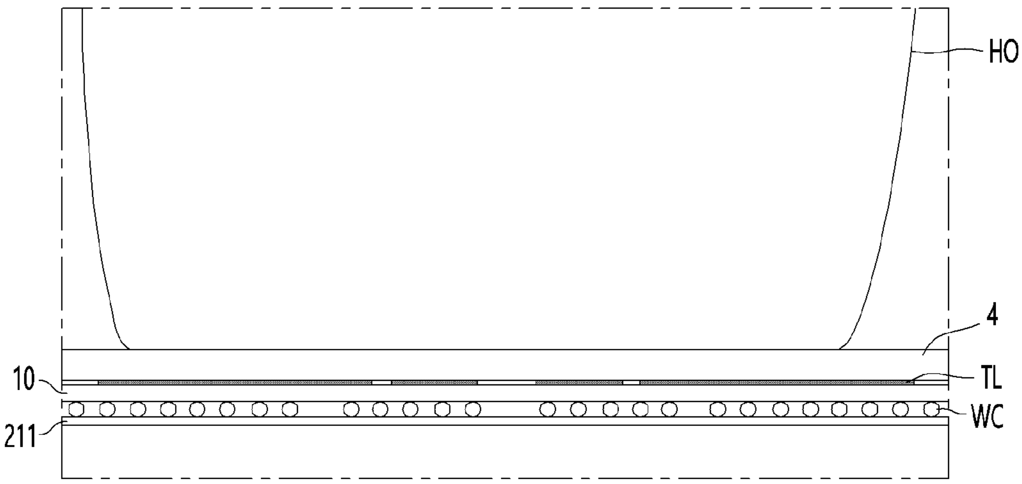
FIG. 3 is a cross-sectional view showing the cover plate shown in FIG. 1, an example working coil provided in an example case, an example ferrite, and an example object to be heated.

FIG. 1 is a perspective view showing an example of an induction heating type cooktop, FIG. 2 is a view showing an example of a bottom surface of a cover plate shown in FIG. 1, and FIG. 3 is a cross-sectional view showing the cover plate shown in FIG. 1, an example working coil provided in an example case, an example ferrite, and an example object to be heated.

An induction heating type cooktop 1 may include a case 2, a cover plate 3, a working coil WC, and a thin layer TL.

The case 2 may be connected to the cover plate 3.

The working coil WC may be installed in the case 2. In addition to the working coil WC, other elements (e.g., a rectifier for supplying AC power and rectifying the supplied AC power to DC power, an inverter for converting the DC power rectified by the rectifier into a resonance current through a switching operation and supplying the resonance current to the working coil, a control module for controlling operations of various devices in the induction heating type cooktop, a relay or a semiconductor switch for turning on or off the working coil, etc.) may be further installed in the case 2. This will be described below.

The cover plate 3 may be disposed on the upper portion of the case 2. The cover plate 3 may cover the upper portion of the case 2.

The cover plate 3 may include an upper plate part 4 on which an object HO is placed and a connecting part 5 connected to the case 2.

The cover plate 3 may be provided with the thin layer TL. The thin layer TL may be formed on the upper plate part 4 of the cover plate 3. The upper plate part 4 may be provided with an upper surface 4*a* on which the object HO is placed and a lower surface 4*b* which is an opposite surface of the upper surface 4*a*, and the thin layer TL may be formed on one of the upper surface 4*a* and the lower surface 4*b*. For example, as shown in FIG. 2, the thin layer TL may be formed on the lower surface 4*b* of the upper plate part 4. Hereinafter, it is assumed that the thin layer TL is formed on the lower surface 4*b* of the upper plate part 4.

For example, the upper plate part 4 may be made of a glass material (e.g., ceramics glass).

Figure 6:
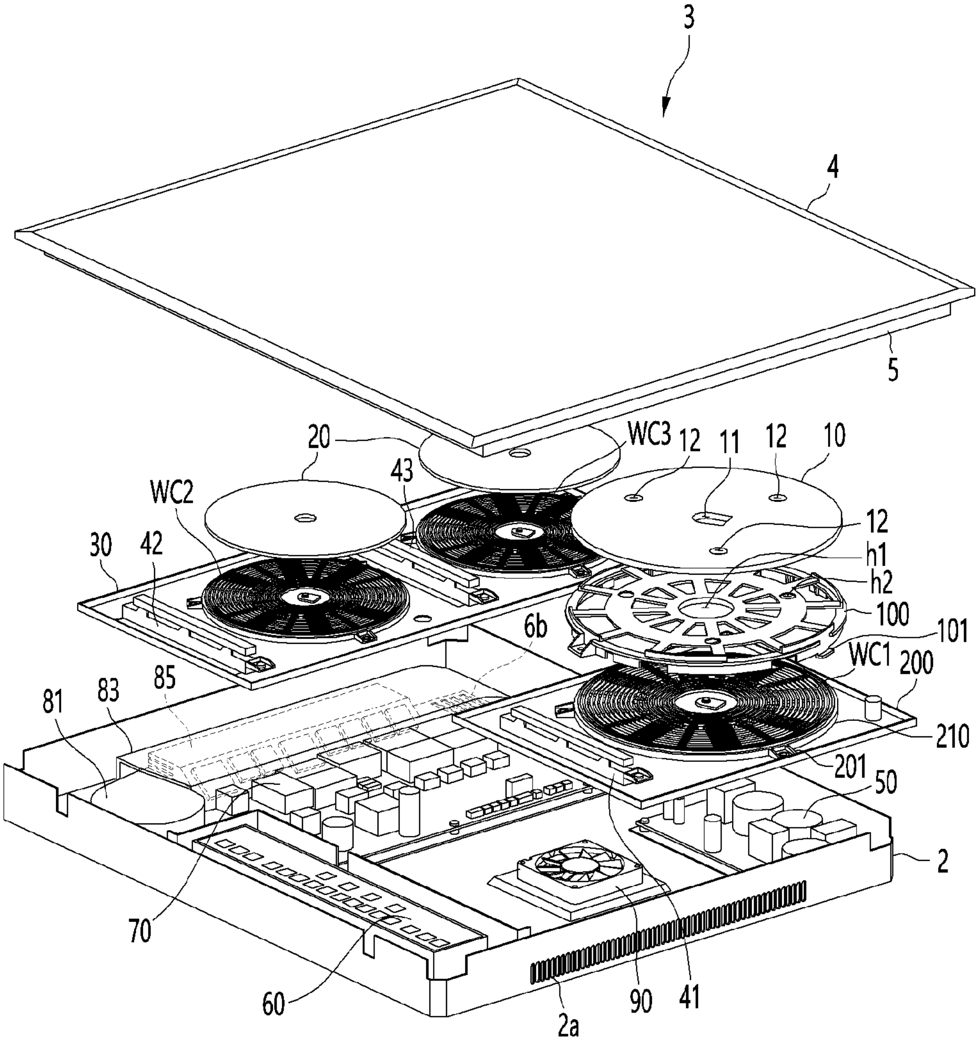
FIG. 6 is an exploded view showing an example of an induction heating type cooktop.

In addition, the upper plate part 4 may be provided with an input interface that receives an input from a user and transfers the input to an input interface control module 60 (see FIG. 6). The input interface may be provided at a position other than the upper plate part 4.

For example, the input interface may be a module for inputting a heating intensity, a driving time of the induction heating type cooktop 1, etc., which is desired by the user, and may be variously implemented as a physical button or a touch panel. In some implementations, the input interface may include, for example, a power button, a lock button, a power level control button (+, −), a timer control button (+, −), a charging mode button, and the like. The input interface may transfer the input provided from the user to the input interface control module 60, and the input interface control module 60 may transfer the input to the control module (i.e., the inverter control module). In addition, the control module may control operations of various devices (e.g., the working coil) based on inputs (i.e., user input) provided from the input interface control module 60. A detailed description thereof will be omitted.

In some examples, whether the working coil WC is driven and the heating intensity (i.e., fire power) may be visually displayed on the upper plate part 4 in a burner shape. The burner shape may be displayed by indicators 41, 42, and 43 including a plurality of light-emitting elements (e.g., LEDs) provided in the case 2.

The working coil WC may be installed inside the case 2 so as to heat the object HO.

Specifically, the driving of the working coil WC may be controlled by the control module. When the object HO is disposed on the upper plate part 4, the working coil WC may be driven by the control module.

In addition, the working coil WC may directly heat an object having magnetic properties (i.e., a magnetic object) and may indirectly heat an object having no magnetic properties (i.e., a non-magnetic object) through the thin layer TL to be described below.

The working coil WC may heat the object HO by an induction heating method and may be provided to overlap the thin layer TL in a longitudinal direction (i.e., a vertical direction or an up-and-down direction).

The thin layer TL may be coated on the upper plate part 4 so as to heat the non-magnetic object among the objects HO.

At least one burner may be provided in the induction heating type cooktop 1, and the thin layer TL may be coated on an area corresponding to the burner of the upper plate part 4. When a plurality of burners are provided in the induction heating type cooktop 1, the thin layer TL may be coated only on a part of the plurality of burners. Referring to the examples shown in FIGS. 1 and 2, three burners F1, F2, and F3 may be provided in the induction heating type cooktop 1, and the thin layer TL may be coated only on the first burner F1 among the three burners F1, F2, and F3. However, this is merely an example, and the thin layer TL may be coated on all the three burners F1, F2, and F3, or the thin layer TL may be coated only on two burners among the three burners F1, F2, and F3.

The thin layer TL may be coated on the upper surface 4*a* or the lower surface 4*b* of the upper plate part 4 and may be provided to overlap the working coil WC in a longitudinal direction (i.e., a vertical direction or an up-and-down direction). Therefore, the object HO may be heated regardless of the arrangement position and type of the object HO.

Hereinafter, the thin layer TL is described as being coated on the lower surface 4*b* of the upper plate part 4, but this is only assumed for convenience of description. That is, the thin layer TL may be coated on the upper surface 4*a* of the upper plate part 4.

In addition, the thin layer TL may have at least one of the magnetic property or the non-magnetic property (i.e., the magnetic property, the non-magnetic property, or both the magnetic property and the non-magnetic property).

The thin layer TL may be made of, for example, a conductive material (e.g., aluminum). As shown in the drawings, the thin layer TL may be coated on the lower surface 4*b* of the upper plate part 4 in a shape in which a plurality of rings having different diameters are repeated, but the present disclosure is not limited thereto.

In some implementations, the thin layer TL may be made of a material other than the conductive material or may be coated on the upper plate part 4 in a different shape. In some examples, the thin layer TL may be made of a conductive material and coated on the upper plate part 4 in a shape having a plurality of rings having different diameters.

In some implementations, one thin layer TL is shown in FIG. 2, but the present disclosure is not limited thereto. For example, a plurality of thin layers may be coated. An example in which one thin layer TL is coated will be described for convenience of description.

The thin layer TL will be described below in more detail.

Referring to FIG. 3, the case 2 may be provided with a heat insulator 10, a working coil WC, a ferrite 211, and the like.

The heat insulator 10 may be provided between the upper plate part 4 and the working coil WC. That is, the heat insulator 10 may be provided between the lower surface 4*b* of the upper plate part 4 and the working coil WC.

The heat insulator 10 may be disposed under the cover plate 3, that is, the upper plate part 4, and the working coil WC may be disposed under the heat insulator 10.

The heat insulator 10 may block heat generated while the thin layer TL or the object HO is heated by the driving of the working coil WC from being transferred to the working coil WC.

In detail, when the thin layer TL or the object HO is heated by electromagnetic induction of the working coil WC, the heat of the thin layer TL or the object HO is transferred to the upper plate part 4, and the heat of the upper plate part 4 is transferred back to the working coil WC, which may cause the working coil WC to be damaged.

Since the heat insulator 10 blocks the heat transmitted to the working coil WC, it is possible to prevent the working coil WC from being damaged by heat and to prevent the heating performance of the working coil WC from being deteriorated.

In some examples, a bracket 100 (see FIG. 6) may be installed between the heat insulator 10 and the working coil WC. That is, the induction heating type cooktop 1 may further include the bracket 100 installed between the heat insulator 10 and the working coil WC.

The bracket 100 may be inserted between the heat insulator 10 and the working coil WC such that the working coil WC does not directly contact the heat insulator 10. Therefore, the bracket 100 may block the heat generated while the thin layer TL or the object HO is heated by the driving of the working coil WC from being transferred to the working coil WC through the heat insulator 10.

That is, since the bracket 100 may share a part of the role of the heat insulator 10, the thickness of the heat insulator 10 may be minimized. his may minimize a distance between the object HO and the working coil WC.

In some implementations, the bracket 100 may be implemented with a plurality of members. The bracket 100 implemented with the plurality of members may be disposed so as to be spaced apart from each other between the working coil WC and the heat insulator 10.

In some implementations, the bracket 100 may guide air blown by a working coil cooling fan 90 (see FIG. 6) to be described below, so as to pass through the working coil WC. That is, the bracket 100 may guide the air blown by the working coil cooling fan 90 so as to pass through the working coil WC, thereby improving the cooling efficiency of the working coil WC.

The induction heating type cooktop 1 may further include the ferrite 211. The ferrite 211 may be mounted under the working coil WC. The ferrite 211 may block a magnetic field generated downward when the working coil WC is driven.

The working coil WC, the ferrite 211, and the like may be mounted to a working coil supporter 210 (see FIG. 6) to be described below. That is, the working coil supporter 210 may support the working coil WC, the ferrite 211, and the like.

The working coil supporter 210 may be mounted to a base plate 200 (see FIG. 6). The base plate 200 is supported to the lower surface of the case 2 and may support the working coil WC, the ferrite 211, and the like. Since the base plate 200 supports the working coil WC, the ferrite 211, and the like, the heat insulator 10 may be brought into close contact with the upper plate part 4. Thus, a distance between the working coil WC and the object HO may be kept constant.

The characteristics and configuration of the thin layer TL will be described in more detail with reference to FIGS. 4 and 5.

Figure 4:
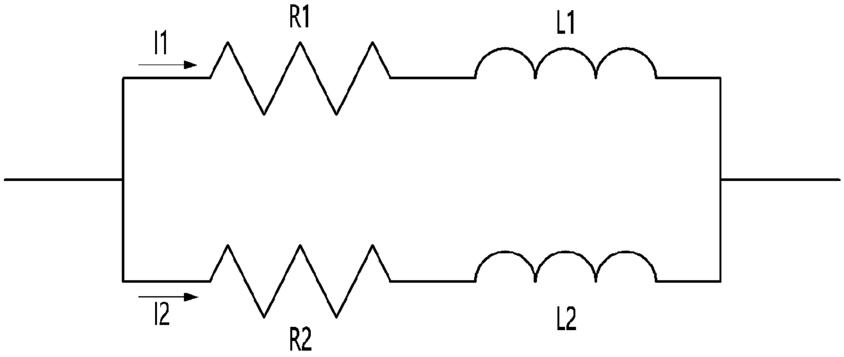
FIGS. 4 and 5 are views illustrating examples of equivalent circuits formed by one or both of an example thin layer and an example object and configured to change an electrical impedance between the thin layer and the object according to the type of the object.
Figure 5:
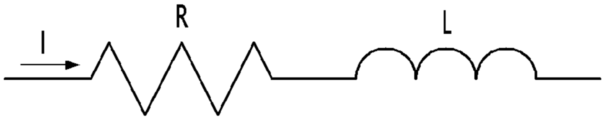

FIGS. 4 and 5 are views for describing a change in impedance between the thin layer and the object according to the type of the object.

The thin layer TL may be made of a material having a low relative permeability.

In detail, since the relative permeability of the thin layer TL is low, a skin depth of the thin layer TL may be deep. The skin depth refers to a current penetration depth from a surface of a material, and the relative permeability may be inversely proportional to the skin depth. Therefore, as the relative permeability of the thin layer TL is lower, the skin depth of the thin layer TL becomes deeper.

In addition, the skin depth of the thin layer TL may be greater than the thickness of the thin layer TL. That is, since the thin layer TL has a small thickness (e.g., 0.1 μm to 1,000 μm) and the skin depth of the thin layer TL is greater than the thickness of the thin layer TL, the magnetic field generated by the working coil WC passes through the thin layer TL and is transferred to the object HO, thereby inducing an eddy current in the object HO.

That is, when the skin depth of the thin layer TL is less than the thickness of the thin layer TL, it may be difficult for the magnetic field generated by the working coil WC to reach the object HO.

In some cases, when the skin depth of the thin layer TL is greater than the thickness of the thin layer TL, the magnetic field generated by the working coil WC may reach the object HO. In some examples, where the skin depth of the thin layer TL is greater than the thickness of the thin layer TL, the magnetic field generated by the working coil WC may pass through the thin layer TL, be mostly transferred to the object HO, and be exhausted to an outside. In this manner, the object HO may be mainly heated.

In some examples, where the thin layer TL has a small thickness as described above, the thin layer TL may have a resistance value at which the thin layer TL may be heated by the working coil WC.

In some examples, the thickness of the thin layer TL may be inversely proportional to the resistance value (i.e., surface resistance value) of the thin layer TL. That is, as the thickness of the thin layer TL coated on the upper plate part 4 becomes smaller, the resistance value (i.e., the surface resistance value) of the thin layer TL increases. Therefore, the thin layer TL may be thinly coated on the upper plate part 4 such that characteristics of the thin layer TL are changed as a load that may be heated.

For example, the thin layer TL may have a thickness of, for example, 0.1 m to 1,000 m, but the present disclosure is not limited thereto.

The thin layer TL having such characteristics exists so as to heat the non-magnetic object. Impedance characteristics between the thin layer TL and the object HO may be changed according to whether the object HO disposed on the upper surface 4*a* of the upper plate part 4 is magnetic or non-magnetic.

An example, where the object HO is a magnetic object, will be described below.

When the magnetic object HO is disposed on the upper surface 4*a* of the upper plate part 4, and the working coil WC is driven, a resistor component R1 and an inductor component L1 of the magnetically object HO may form an equivalent circuit with a resistor component R2 and an inductor component L2 of the thin layer TL as shown in FIG. 4.

In some cases, the impedance of the magnetic object HO in the equivalent circuit (i.e., the impedance composed of R1 and L1) may be less than the impedance of the thin layer TL (i.e., the impedance composed of R2 and L2).

Therefore, when the equivalent circuit as described above is formed, a magnitude of an eddy current I1 applied to the magnetic object HO may be greater than a magnitude of an eddy current I2 applied to the thin layer TL. Therefore, most of the eddy current generated by the working coil WC may be applied to the object HO, and the object HO may be heated.

That is, when the object HO is a magnetic object, the above-described equivalent circuit is formed and most of the eddy current is applied to the object HO. Therefore, the working coil WC may directly heat the object HO.

Since a part of the eddy current is also applied to the thin layer TL, the thin layer TL is slightly heated. Therefore, the object HO may be slightly indirectly heated by the thin layer TL. However, the degree to which the object HO is indirectly heated by the thin layer TL is not significant, when compared with the degree to which the object HO is directly heated by the working coil WC.

An example, where which the object is a non-magnetic object, will be described below.

When the non-magnetic object HO is disposed on the upper surface 4*a* of the upper plate part 4 and the working coil WC is driven, no impedance may exist in the non-magnetic object HO and the impedance may exist in the thin layer TL. That is, a resistor component R and an inductor component L may exist only in the thin layer TL.

Therefore, when the non-magnetic object HO is disposed on the upper surface 4*a* of the upper plate part 4 and the working coil WC is driven, the resistor component R and the inductor component L of the thin layer TL may form an equivalent circuit as shown in FIG. 5.

Therefore, the eddy current I may be applied only to the thin layer TL, and the eddy current may not be applied to the non-magnetic object HO. In more detail, the eddy current I generated by the working coil WC may be applied only to the thin layer TL, and the thin layer TL may be heated.

That is, when the object HO is non-magnetic, as described above, the eddy current I is applied to the thin layer TL and the thin layer TL is heated. Thus, the non-magnetic object HO may be indirectly heated by the thin layer TL that is heated by the working coil WC.

In summary, the object HO may be directly or indirectly heated by one heat source, called the working coil WC, regardless of whether the object HO is magnetic or non-magnetic. That is, when the object HO is the magnetic object, the working coil WC may directly heat the object HO, and when the object HO is the non-magnetic object, the thin layer TL heated by the working coil WC may indirectly heat the object HO.

As described above, since the induction heating type cooktop 1 may heat both the magnetic object and the non-magnetic object, the object may be heated regardless of the arrangement position and type of the object. Therefore, the user may place the object on any heating area on the upper plate part 4 without having to know whether the object is magnetic or non-magnetic, thereby improving user convenience.

In some examples, where the induction heating type cooktop 1 may directly or indirectly heat the object with the same heat source, the cooktop may not include a separate heating plate or radiant heater. Therefore, the heating efficiency may be improved, and the material cost may be reduced.

In some examples, the heat generated in the thin layer TL may be transferred to the upper plate part 4 and may also be transferred under the thin layer TL. The heat transferred from the thin layer TL or the object to the upper plate part 4 may also be transferred under the upper plate part 4. That is, the heat generated in the thin layer TL or the object HO may not only heat the object HO, but also heat the components disposed under the thin layer TL and the upper plate part 4. In particular, the heat generated in the thin layer TL may heat the working coil WC. In this case, the working coil WC may be damaged or the heating performance of the working coil WC may be deteriorated.

In detail, an insulating layer of the working coil WC may have a heat resistance temperature of about 200° C. or less. In this case, when the working coil WC is exposed to heat of 200° C. or more, the insulating layer is broken, and thus a problem such as a fire due to synthesis or the like may occur. In order to make the non-magnetic object HO heated by the thin layer TL, the thin layer TL may be heated to about 600° C. or more. In this case, the heat resistance temperature (e.g., about 200° C.) of the working coil WC is significantly lower than the heating temperature (e.g., about 600° C.) of the thin layer TL. Therefore, the heat generated in the thin layer TL may cause the working coil WC to be damaged.

In addition, the heat generated in the thin layer TL may damage other components vulnerable to heat, such as an inverter 70.

Therefore, in the induction heating type cooktop 1, there is a need for a method for minimizing the problem that the heat generated from the thin layer TL damages the components such as the working coil WC and the inverter 70.

To this end, the induction heating type cooktop 1 may further include a working coil cooling fan 90. The heat generated in the thin layer TL may be cooled by using the air introduced through the working coil cooling fan 90, thereby minimizing the damage to the components inside the induction heating type cooktop 1.

Figure 7:
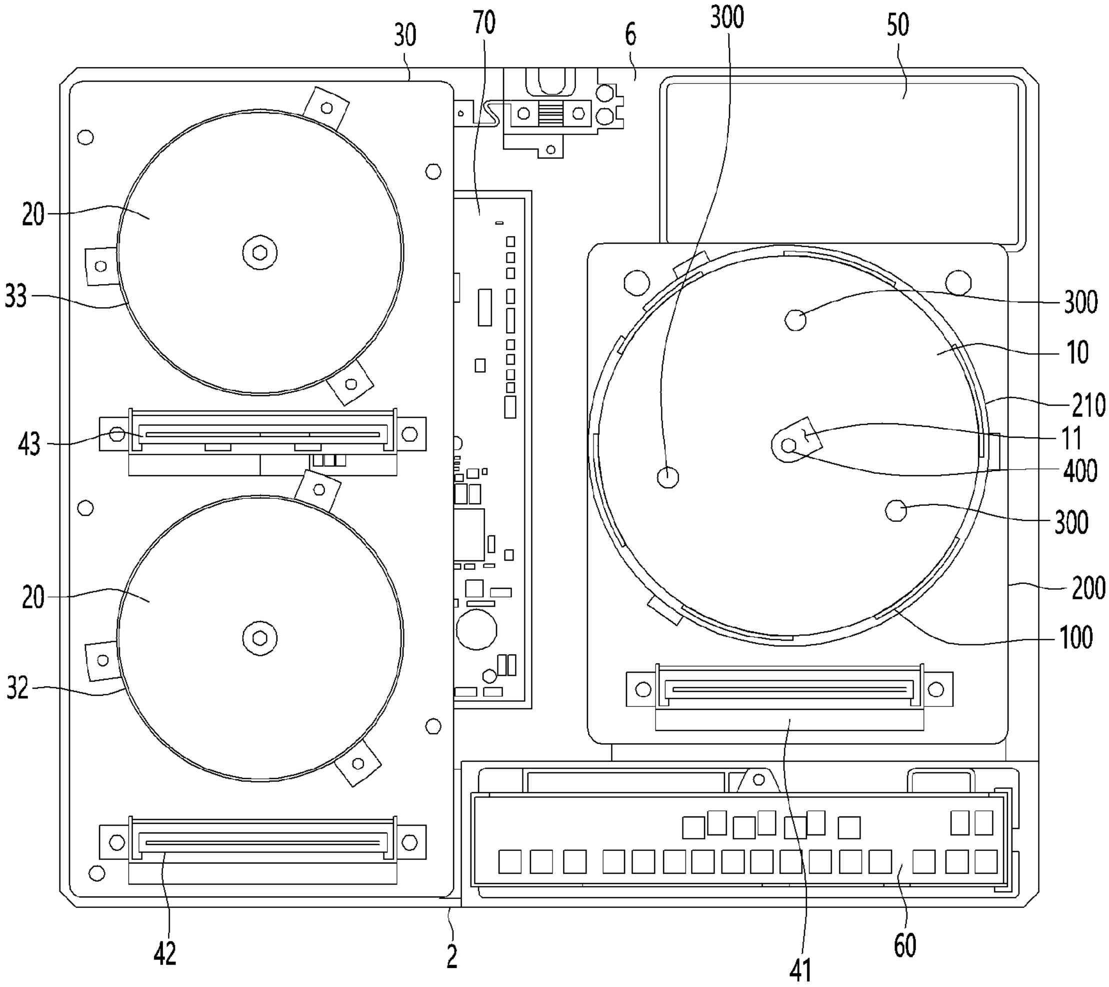
FIG. 7 is a view showing an example of an induction heating type cooktop in a state in which a cover plate is separated from the induction heating type cooktop.
Figure 8:
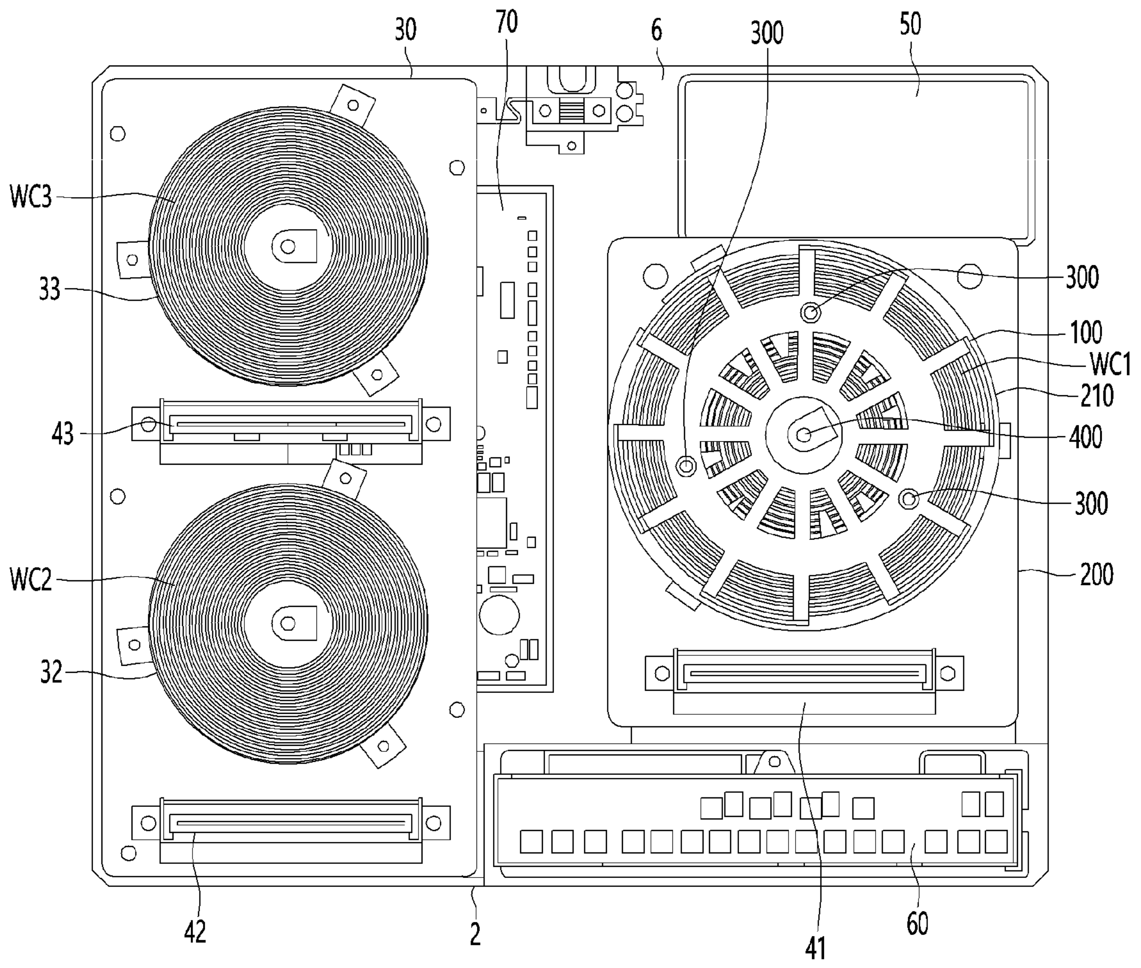
FIG. 8 is a view showing the induction heating type cooktop in a state in which a heat insulator is separated in FIG. 7.
Figure 9:
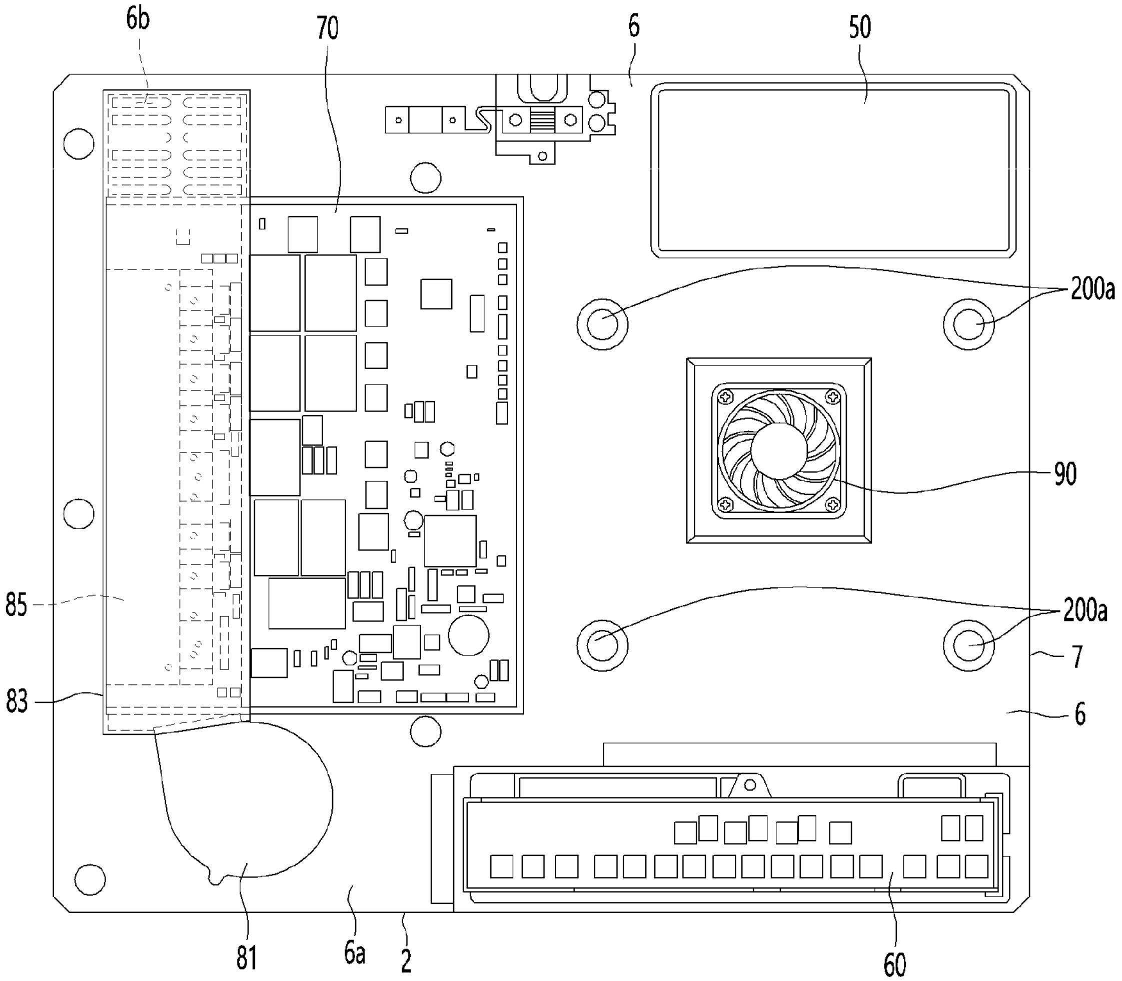
FIG. 9 is a view showing the induction heating type cooktop in a state in which a working coil module is separated in FIG. 8.

FIG. 6 is an exploded view showing an example of an induction heating type cooktop, FIG. 7 is a view showing an example of the cooktop in a state in which a cover plate is separated from the induction heating type cooktop, FIG. 8 is a view showing an example of the cooktop in a state in which a heat insulator is separated in FIG. 7, and FIG. 9 is a view showing an example state in which a working coil module is separated in FIG. 8.

In some implementations, an induction heating type cooktop 1 may include all or at least part of a case 2, a cover plate 3, a power supply module 50, an input interface control module 60, an inverter 70, working coils WC1, WC2, and WC3, and a thin layer TL.

The power supply module 50, the input interface control module 60, the inverter 70, the working coils WC1, WC2, and WC3, and the like may be accommodated in the case 2. In some examples, various modules and devices for driving the induction heating type cooktop 1, such as a control module and an inverter cooling fan 81, may be accommodated in the case 2. In some examples, the control module 60 may include an electric circuit, an integrated circuit, a processor, a controller, or the like.

In some implementations, the side surface of the case 2 may define at least one slit 2*a* through which heat inside the case 2 is exhausted to the outside. For example, heat may be generated during operation of various modules and devices provided in the case 2, and may be exhausted to the outside of the case 2 through the slit 2*a*.

The cover plate 3 may cover the case 2. As described above, a cover plate 3 may be coated with the thin layer TL.

The power supply module 50 may include a power supply that supplies AC power and a rectifier that rectifies the supplied AC power into DC power.

The input interface control module 60 may transmit an input to the control module such that the induction heating type cooktop 1 is operated according to an input through an input interface.

The inverter 70 may convert the DC power rectified by the rectifier into a resonance current through a switching operation and supply the resonance current to the working coil WC. The inverter 70 may include an inverter printed circuit board (PCB) in which a switching element including an insulated gate bipolar transistor (IGBT), a bridge diode (BD), and the like are integrated.

The control module may control operations of various modules and devices in the induction heating type cooktop 1. The control module may control the inverter 70. In some cases, the control module may include the inverter 70.

The switching element provided in the inverter 70 may be driven such that a current flow through the working coil WC, and the working coil WC may generate a magnetic field according to the flow of the current.

The number of working coils WC may determine the number of burners formed in the induction heating type cooktop 1. For example, as shown in FIG. 6, when the induction heating type cooktop 1 includes three working coils WC1, WC2, and WC3, three burners F1, F2, and F3 may be formed.

The burner may refer to an area in which heat is provided by the working coil WC. The object HO may be placed on the burner. The burner may be an area spaced apart from at least part of the working coil WC in a vertical direction. FIG. 6 illustrates an example in which three burners are formed by three working coils WC1, WC2, and WC3, but the number of working coils WC is merely an example. That is, the present disclosure may include the induction heating type cooktop 1 including one or more working coils WC. Hereinafter, for convenience of description, it is assumed that the induction heating type cooktop 1 includes three working coils WC1, WC2, and WC3 and three burners are formed.

As described above, the thin layer TL may be formed on the upper surface 4*a* or the lower surface 4*b* of the upper plate part 4. The thin layer TL may be formed at a position corresponding to the burner. For example, when three burners F1, F2, and F3 are formed in the induction heating type cooktop 1, the thin layer TL may be formed in each of the three burners or may be formed in only some of the three burners. Hereinafter, for convenience of description, it is assumed that the thin layer TL is coated only on one of the three burners F1, F2, and F3. In particular, it is assumed that the thin layer TL is coated only on the first burner F1, and the thin layer TL is not coated on the second burner F2 and the third burner F3. That is, it is assumed that the thin layer TL is coated only in the area of the upper plate part 4 corresponding to the first working coil WC1 and the thin layer TL is formed in the areas corresponding to the second and third working coils WC2 and WC3, but this is merely an example and the present disclosure is not limited thereto.

The induction heating type cooktop 1 may further include heat insulators 10 and 20.

The heat insulators 10 and 20 may be disposed between the working coil WC and the burner. The heat insulators 10 and 20 may be disposed under the upper plate part 4.

In some implementations, the heat insulator 20 may be omitted under the burner in which the thin layer TL is not coated. That is, the induction heating type cooktop 1 may include only the heat insulator 10 disposed under the thin layer TL.

The heat insulators 10 and 20 may be disposed between the upper plate part 4 and the working coil WC. The heat insulator 20 may be disposed directly on the working coils WC2 and WC3. In this case, the heat insulator 20 may block the transfer of heat of at least one of the upper plate part 4 or the thin layer TL to the working coils WC2 and WC3.

In addition, the heat insulator 10 may be disposed on the bracket 100 that is disposed on the working coil WC1. In this case, each of the heat insulator 10 and the bracket 100 may block the transfer of heat of at least one of the upper plate part 4 or the thin layer TL to the working coil WC1, thereby increasing the heat blocking effect. At this time, the bracket 100 may be a fixing member for fixing the heat insulator 10. That is, the bracket 100 may function as a heat insulator mounting part.

As shown in FIG. 6, the heat insulator 10 may be provided with a first sensing hole 11 and a second sensing hole 12. The first sensing hole 11 may be a hole in which a temperature sensor 400 for sensing the temperature of the upper plate part 4 is disposed, and the second sensing hole 12 may be a hole in which a temperature sensor 300 for sensing the temperature of the thin layer TL is disposed.

The first sensing hole 11 may overlap the area of the upper plate part 4 in which the thin layer TL is not formed in the vertical direction, and the second sensing hole 12 may overlap the thin layer TL in the vertical direction.

When the induction heating type cooktop 1 further includes the bracket 100, the bracket 100 may be provided with a first sensor hole h1 overlapping the first sensing hole 11 in the vertical direction, and a second sensor hole h2 overlapping the second sensing hole 12 in the vertical direction.

The bracket 100 may be disposed between the heat insulator 10 and the working coil WC1. The bracket 100 may be disposed above the working coil WC1 that heats the thin layer TL.

The bracket 100 may be inserted between the heat insulator 10 and the working coil WC1 such that the working coil WC1 and the heat insulator 10 do not directly contact each other. Therefore, the bracket 100 may block the heat generated while the thin layer TL or the object HO is heated by the driving of the working coil WC1 from being transferred to the working coil WC1 through the heat insulator 10. That is, since the bracket 100 may share a part of the role of the heat insulator 10, the thickness of the heat insulator 10 may be minimized. This may minimize a distance between the object HO and the working coil WC1.

In addition, at least part of a cooling passage for cooling the working coil WC1 may be formed in the bracket 100.

The cooling passage may be an air passage in which air blown by the working coil cooling fan 90 passes through the working coil WC1. The bracket 100 may guide the air introduced into the case 2 by the working coil cooling fan 90 to pass through the working coil WC1, thereby improving the cooling efficiency of the working coil WC1. The cooling passage formed in the bracket 100 will be described in detail with reference to FIGS. 16 to 18.

The bracket 100 may be supported by at least one of the working coil supporter 210 or the base plate 200. That is, the bracket 100 may be mounted to the working coil module.

The working coil module may refer to the working coils WC1, WC2, and WC3 and members configured to support the working coils WC1, WC2, and WC3. For example, the working coil module may include working coils WC1, WC2, and WC3, working coil supporters 210, 32, 33 around which the working coils WC1, WC2, and WC3 are wound, and base plates 200 and 30 configured to support the working coil supporters 210, 32, and 33.

The working coils WC1, WC2, and WC3 may be wound around the working coil supporters 210, 32, and 33. The first working coil WC1 may be wound around the first working coil supporter 210, the second working coil WC2 may be wound around the second working coil supporter 32, and the third working coil WC3 may be wound around the third working coil supporter 33.

The working coil supporters 210, 32, and 33 may be members around which the working coil WC1 is wound. The working coil supporters 210, 32, and 33 may support the working coils WC1, WC2, and WC3. Ferrites may be disposed on the working coil supporters 210, 32, and 33. The working coil supporters 210, 32, and 33 may be mounted to the base plates 200 and 30.

The base plates 200 and 30 may be members configured to support the working coil supporter 210 and the working coils WC1, WC2, and WC3. Indicators 41, 42, and 43 may be further disposed on the base plates 200 and 30.

Coupling parts 101 and 201 may be formed in the bracket 100 and the working coil supporter 210, respectively. As a coupling member, such as a bolt, passes through the coupling parts 101 and 201 and is fixed to the base plate 200, the bracket 100 and the working coil supporter 210 may be mounted to the base plate 200.

The base plate 200 may be supported by at least one support member 200*a*. The support member 200*a* may be a pillar configured to support the base plate 200. The support member 200*a* is disposed between the base plate 200 and a bottom plate 6 so as to separate the base plate 200 from the bottom plate 6. A space in which a working coil cooling fan 90 is installed may be defined between the base plate 200 and the bottom plate 6 by the support member 200*a*.

The working coil cooling fan 90 may be installed under the base plate 200. The working coil cooling fan 90 may be disposed between the base plate 200 and the bottom plate 6.

The bottom plate 6 may form the bottom surface of the case 2. An opening 6*c* (see FIG. 18) may be defined in the bottom plate 6. In addition to the opening 6*c*, an air suction port 6*a* (see FIG. 11) and an air discharge port 6*b* (see FIGS. 10 and 11) may be further defined in the bottom plate 6.

The opening 6*c* may be defined under the working coil cooling fan 90 in the bottom plate 6. The working coil cooling fan 90 may suction air outside the case 2 through the opening 6*c* and blow the suctioned air into a cooling passage defined in the bracket 100. In detail, the air blown by the working coil cooling fan 90 may pass through a base hole 202 (see FIG. 17) defined in the base plate 200, may be introduced into an air space 212 (see FIG. 17) of the working coil supporter 210, and may be blown into the cooling passage defined in the bracket 100. Therefore, the working coil WC1 may be cooled by the air blown by the working coil cooling fan 90. That is, the damage to the working coil WC1 due to high heat generated in the thin layer TL may be minimized.

To this end, the working coil cooling fan 90, the base plate 200, the working coil supporter 210, and the bracket 100 may be disposed in the height direction in this order.

In some examples, since the inverter 70 is a part that is vulnerable to heat when compared with other components, the inverter 70 may be disposed so as not to overlap the thin layer TL in the vertical direction. Therefore, the inverter 70 may be disposed so as not to overlap a working coil module, to which the first working coil WC1 is mounted, in the vertical direction.

In some examples, due to the volume occupied by the working coil module to which the first working coil WC1 is mounted, the arrangement space of the inverter may be narrowed in the case 2. In particular, since an inverter cooling fan or the like has to be disposed around the inverter so as to cool heat generated by the inverter itself, a space in which the inverter, the inverter cooling fan, and the like are safely disposed has to be provided in the case 2 while minimizing an increase in the volume of the case 2. Therefore, the inverter is not provided separately for each of the first to third working coils WC1, WC2, and WC3 and may be provided as one inverter 70 as an integrated inverter. As such, when one inverter 70 performs a switching operation such that a current is applied to the first to third working coils WC1, WC2, and WC3, a lot of heat may be generated particularly in the inverter 70. That is, when the inverters respectively corresponding to the first to third working coils WC1, WC2, and WC3 are individually provided, the integrated inverter is highly likely to overheat due to frequent switching operations. In some examples, where the induction heating type cooktop 1 includes the integrated inverter, the cooktop 1 may include a structure for cooling heat generated in the inverter.

Figure 10:
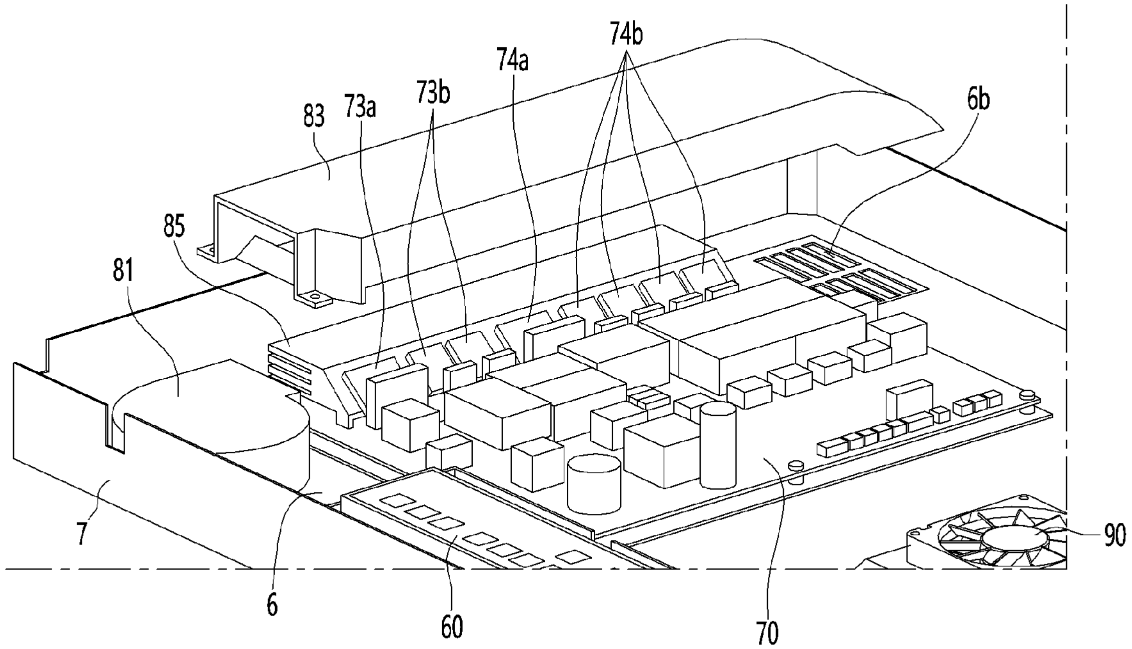
FIG. 10 is a view showing the induction heating type cooktop in a state in which an air guide is separated from a case.
Figure 11:
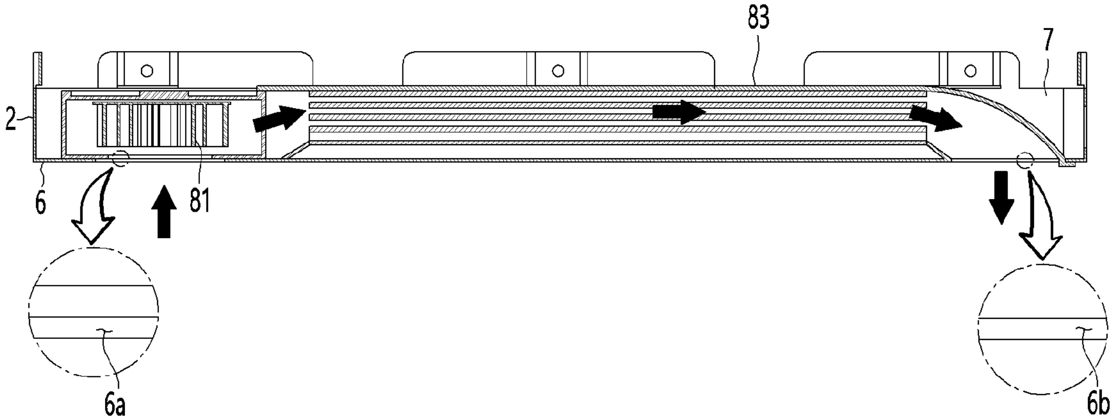
FIG. 11 is a view showing an example of flow of air blown by an example inverter cooling fan of the induction heating type cooktop.
Figure 12:
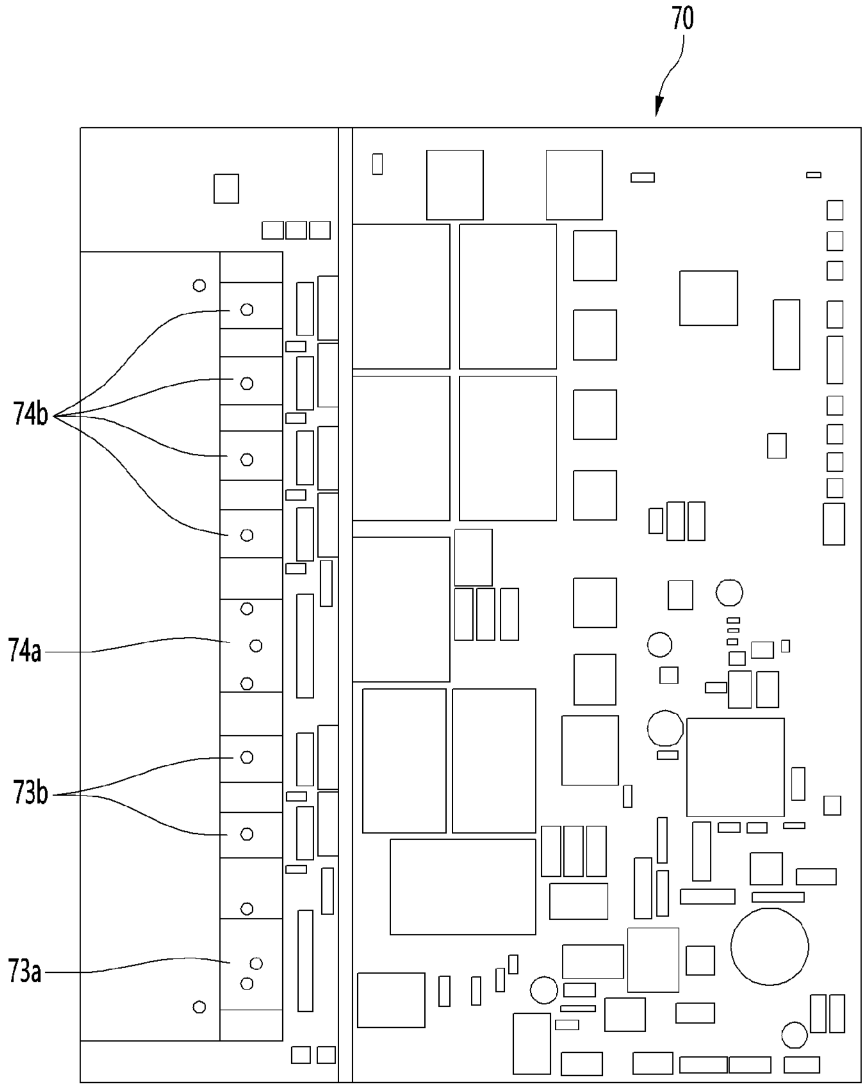
FIG. 12 is a view showing an example of an inverter installed in the induction heating type cooktop.

FIG. 10 is a view showing an example state in which an air guide is separated from a case in the induction heating type cooktop, FIG. 11 is a view showing an example flow of air blown by an inverter cooling fan in the induction heating type cooktop, and FIG. 12 is a view showing an example of an inverter installed in the induction heating type cooktop.

The induction heating type cooktop 1 may further include at least one of an inverter cooling fan 81, an air guide 83, or a heat sink 85.

The inverter cooling fan 81 is a fan for cooling the inverter 70 and may blow air toward the inverter 70.

The inverter cooling fan 81 may suction air outside the case 2 and blow air such that the suctioned air passes through at least part of the inverter 70.

The case 2 may be provided with an air suction port 6*a*. The air suction port 6*a* may be a hole through which the air outside the case 2 is suctioned into the case 2. For example, the air suction port 6*a* may be defined on the bottom surface of the case 2, that is, the bottom plate 6. The air suction port 6*a* may be defined at a position overlapping the inverter cooling fan 81 in the vertical direction.

The air passing through the air suction port 6*a* by the inverter cooling fan 81 may be guided to the air guide 83. An inlet of the air guide 83 may communicate with the air suction port 6*a*.

The air guide 83 may guide the air passing through the inverter 70 to the outside of the case 2. An outlet of the air guide 83 may communicate with an air discharge port 6*b* defined in the case 2.

The air discharge port 6*b* may be defined on the side 7 of the case 2 or the bottom plate 6 of the case 2. The induction heating type cooktop 1 is generally installed in close contact with a wall. Therefore, when the air discharge port 6*b* is defined on the side 7 of the case 2, at least part of the air passing through the air discharge port 6*b* may hit the wall and flow into the case 2 again. In some cases, as shown in FIG. 10, when the air discharge port 6*b* is defined in the bottom plate 6, that is, the bottom surface of the case 2, the air discharged through the air discharge port 6*b* spreads from the bottom of the case 2 in all directions. Therefore, a case in which the air passing through the air discharge port 6*b* flows back into the case 2 may be minimized. The air discharged through the air discharge port 6*b* may be air whose temperature is slightly increased by the inverter 70 while passing through the air guide 83. A case in which the internal temperature of the case 2 rises may be minimized by minimizing the case in which the air whose temperature is slightly increased flows into the case 2 again.

The air guide 83 may be disposed on the inverter 70. The air guide 83 may form a passage of air passing through the inverter 70. As such, when the induction heating type cooktop 1 includes the air guide 83, the air passing through the inverter 70 is concentrated by the air guide 83 and flows faster, thereby the cooling efficiency of the inverter 70.

In some implementations, the air guide 83 may be disposed such that an air passage is defined in an area in which bridge diodes 73*a* and 74*a* and IGBTs 73*b* and 74*b* are disposed in the inverter 70. In this case, the air blown by the inverter cooling fan 81 may intensively cool hot heat generated from at least one of the bridge diodes 73*a* and 74*a* or the IGBTs 73*b* and 74*b* while passing through the air guide 83. As such, when the air guide 83 is installed such that at least one of the bridge diodes 73*a* and 74*a* or the IGBTs 73*b* and 74*b* is disposed therein, the heat generated from the bridge diodes 73*a* and 74*a* or the IGBTs 73*b* and 74*b*, which are the main heating elements of the inverter 70, is discharged to the outside of the case 2 more quickly. Therefore, a case in which the bridge diodes 73*a* and 74*a* and the IGBTs 73*b* and 74*b* are overheated and damaged may be minimized.

That is, the air guide 83 may intensively cool the heat generated in the inverter 70, particularly, at least one of the bridge diodes 73*a* and 74*a* or the IGBTs 73*b* and 74*b*.

In addition, the induction heating type cooktop 1 may further include a heat sink 85. The heat sink 85 may be installed on the inverter 70.

The heat sink 85 may be installed adjacent to the bridge diodes 73*a* and 74*a* and the IGBTs 73*b* and 74*b* in the inverter 70. The heat sink 85 may be installed in contact with the bridge diodes 73*a* and 74*a* and the IGBTs 73*b* and 74*b*.

The heat sink 85 may be installed inside the air guide 83. In particular, the heat sink 85 may be installed on an air passage defined by the air guide 83.

The heat sink 85, the bridge diodes 73*a* and 74*a*, and the IGBTs 73*b* and 74*b* may be disposed in the air passage defined by the air guide 83.

The heat sink 85 may absorb the heat generated from at least one of the bridge diodes 73*a* and 74*a* or the IGBTs 73*b* and 74*b*. In this manner, the heat generated in the bridge diodes 73*a* and 74*a* and the IGBTs 73*b* and 74*b* may be cooled more quickly.

As such, in a case in which the induction heating type cooktop 1 further includes the heat sink 85 disposed inside the air guide 83, the heat generated in at least one of the bridge diodes 73*a* and 74*a* or the IGBTs 73*b* and 74*b* may be cooled faster than in a case in which the heat sink 85 is not included.

The bridge diodes 73*a* and 74*a* or the IGBTs 73*b* and 74*b* may be disposed on the air passage defined by the air guide 83 in the inverter 70. In particular, the bridge diodes 73*a* and 74*a* or the IGBTs 73*b* and 74*b* may be disposed at positions contacting the heat sink 85. In this case, the cooling rate of the heat generated in at least one of the bridge diodes 73*a* and 74*a* or the IGBTs 73*b* and 74*b* may be faster.

In addition, as shown in FIGS. 10 and 12, the bridge diodes 73*a* and 74*a* may be disposed closer to the inlet of the air guide 83 than the IGBTs 73*b* and 74*b*.

In detail, the induction heating type cooktop 1 may include the first bridge diode 73*a* and the first IGBT 73*b* corresponding to the first working coil WC1 and the second bridge diode 74*a* and the second IGBT 74*b* corresponding to the second and third working coils WC2 and WC3. A current may be supplied to the first working coil WC1 by the driving of the first bridge diode 73*a* and the first IGBT 73*b*, and a current may be supplied to the second working coil WC2 or the third working coil WC3 by the driving of the second bridge diode 74*a* and the second IGBT 75*b*.

In this case, the first bridge diode 73*a* may be disposed closer to the inlet of the air guide 83 than the first IGBT 73*b*, and the second bridge diode 74*a* may be disposed closer to the inlet of the air guide 83 than the second IGBT 74*b*. Therefore, there is an advantage that may quickly cool the heat generated in the bridge diodes 73*a* and 74*a*, which generate more heat than the IGBTs 73*b* and 74*b*.

When the output of the second working coil WC2 and the output of the third working coil WC3 are smaller than the output of the first working coil WC1, the first bridge diode 73*a* and the first IGBT 73*b* may be disposed closer to the inlet of the air guide 83 than the second bridge diode 74*a* and the second IGBT 75*b*. Therefore, due to the magnitude of the output, there is an advantage that more quickly cool the heat generated much more in the first bridge diodes 73*a* and the first IGBT 73*b* corresponding to the first working coil WC1 than the second bridge diode 74*a* and the second IGBT 74*b* corresponding to the second and third working coils WC2 and WC3.

As described above, although the induction heating type cooktop 1 further includes the thin layer TL and the working coil cooling fan 90 for cooling the heat generated by the thin layer TL, the components such as the working coil WC and the inverter 70 may be stably cooled without substantially increasing the volume of the case 2.

In some examples, in the induction heating type cooktop 1, a cooling passage through which air blown by the working coil cooling fan 90 passes may be defined such that the working coil WC1 is cooled more quickly.

The induction heating type cooktop 1 may further include a member provided with a cooling passage in which the air blown by the working coil cooling fan 90 passes through the working coil WC1 and is exhausted.

Figure 13:
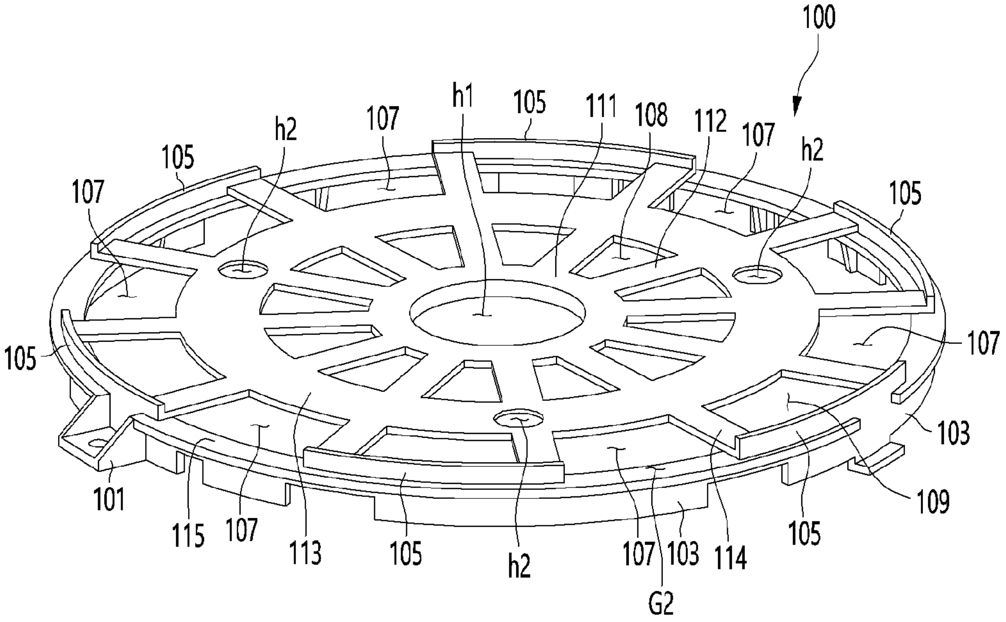
FIG. 13 is a view showing an example bracket disposed in the induction heating type cooktop.
Figure 14:
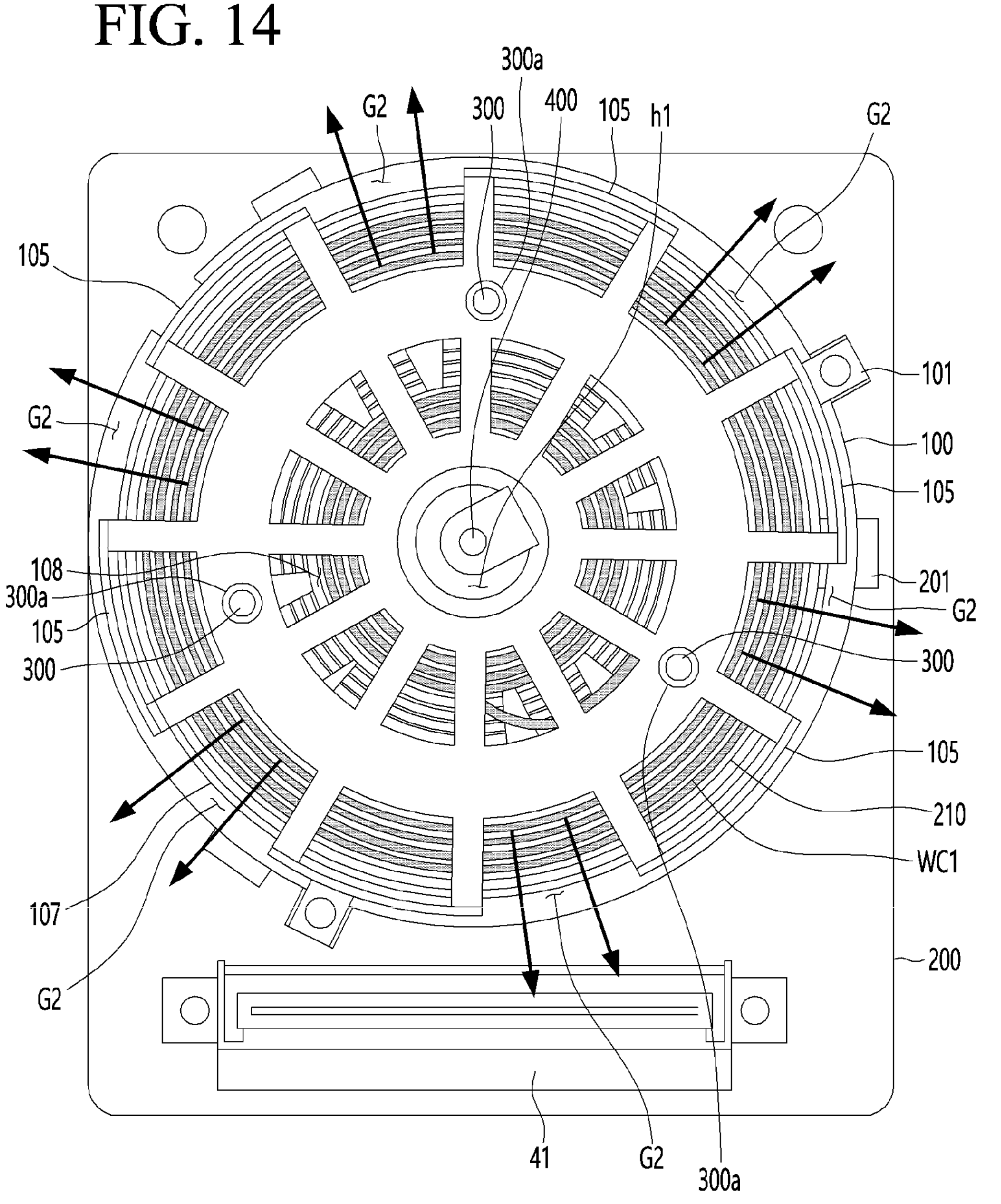
FIG. 14 is a view showing an example of a working coil module in a state in which the bracket shown in FIG. 13 is mounted to the working coil module.
Figure 15:
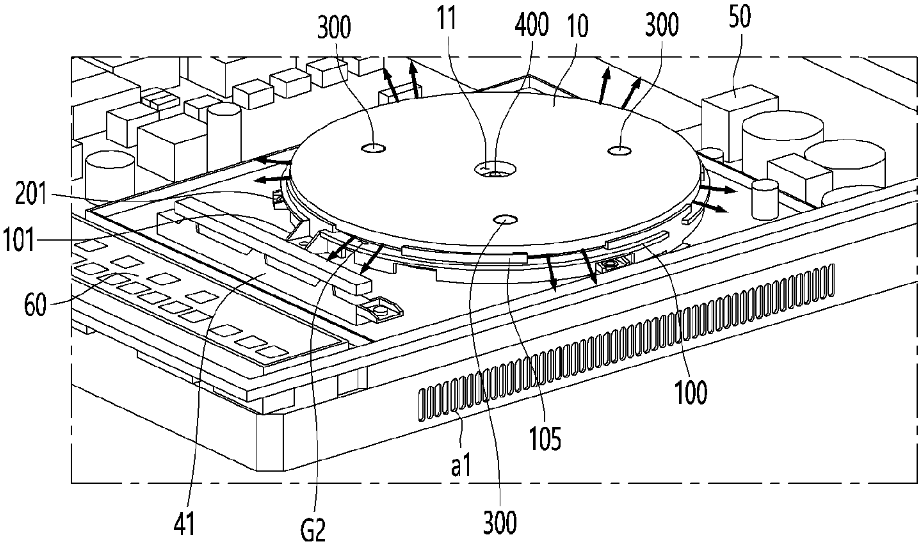
FIG. 15 is a view showing an example a heat insulator mounted to the bracket shown in FIG. 14.

FIG. 13 is a view showing an example bracket provided in the induction heating type cooktop, FIG. 14 is a view showing an example state in which the bracket shown in FIG. 13 is mounted to a working coil module, and FIG. 15 is a view showing an example state in which a heat insulator is mounted to the bracket shown in FIG. 14.

The bracket 100 may be mounted to an induction heating module. The bracket 100 may form a cooling passage through which the air blown by the working coil cooling fan 90 passes and may function as a heat insulator mounting part or a temperature sensor mounting part.

The bracket 100 may be provided with an inner member 111, a middle member 113, and an outer member 115. An inner bridge 112 may be formed between the inner member 111 and the middle member 113. An outer bridge 114 may be formed between the middle member 113 and the outer member 115.

A first sensor hole h1 may be defined in the inner member 111. The first sensor hole h1 may be a hole through which a sensor configured to sense the temperature of the upper plate part 4 passes. At least one second sensor hole h2 may be defined in the middle member 113. The second sensor hole h2 may be a mounting space of a sensor configured to sense the temperature of the thin layer TL. In this case, the bracket 100 may function as a temperature sensor mounting part.

The outer member 115 may form an outer circumference of the bracket 100. A coupling part 101 may be formed outside the outer member 115. A support part 103 may be formed under the outer member 115. A guide part 105 may be formed above the outer member 115.

The coupling part 101 may be mounted to the base plate 200. The coupling part 101 may be mounted to the base plate 200 through a coupling member such as a bolt and a nut.

The support part 103 may be supported to the base plate 200. A lower end of the support part 103 may be in contact with the base plate 200 and support the bracket 100.

The guide part 105 may guide the mounting position of the heat insulator 10. The guide part 105 may protrude upward along the outer member 115, and the heat insulator 10 may be disposed inside the guide part 105.

The guide part 105 may fix the heat insulator 10. The guide part 105 may minimize that the heat insulator 10 is spaced in the horizontal direction. As such, the guide part 105 is formed in the bracket 100 so as to function as a heat insulator mounting part.

The guide part 105 may be one member having a circular shape. Alternatively, as shown in FIG. 13, the guide part 105 may be formed in a circular shape because a plurality of guide members are disposed spaced apart along a virtual circle. In this case, a cooling passage outlet G2 may be defined between the guide members forming the guide part 105. That is, the cooling passage outlet G2 may be defined in the guide part 105, and the cooling passage outlet G2 may be a gap through which air passing through the cooling passage defined in the bracket 100 is exhausted. As shown in FIG. 15, the cooling passage outlet G2 may be defined between the heat insulator 10 and the bracket 100. That is, the cooling passage outlet G2 may be defined between the lower surface of the heat insulator 10 and the bracket 100.

A cooling passage inlet G1 (see FIG. 17) may be defined between the base plate 200 and the working coil supporter 210. This will be described in detail with reference to FIG. 17.

The inner bridge 112 may connect the inner member 111 to the middle member 113. As shown in FIG. 13, at least one first through-hole 108 may be defined in the inner bridge 112. When the first through-hole 108 is defined in the inner bridge 112, at least part of the heat generated in the thin layer TL and the like may flow to the first through-hole 108. In this case, the heat transfer to the member forming the bracket itself, such as the inner bridge 112, may be dispersed. Therefore, the problem that the bracket 100 is deformed due to overheating may be minimized.

In some implementations, the first through-hole 108 may not be defined in the inner bridge 112.

The inner bridge 112 may be provided with a plurality of bridge members connecting the inner member 111 to the middle member 113 such that a plurality of first through-holes 108 are defined in the inner bridge 112. As such, when the plurality of bridge members connect the inner member 111 to the middle member 113, the rigidity of the bracket 100 is increased. Therefore, the inner bridge 112 may be provided with more than a set number of bridge members according to the material, thickness, or the like.

The outer bridge 114 may connect the middle member 113 to the outer member 115. At least one connection hole 107 may be defined in the outer bridge 114.

The connection hole 107 is a part of the cooling passage defined in the bracket 100 and may be a hole connected to the cooling passage outlet G2. The connection hole 107 and the cooling passage outlet G2 may communicate with each other. Air introduced into the cooling passage defined in the bracket 100 may sequentially pass through the connection hole 107 and the cooling passage outlet G2.

A plurality of connection holes 107 may be defined in the outer bridge 114. The number of connection holes 107 may be the same as the number of cooling passage outlets G2. As shown in FIG. 13, a second through-hole 109 may be defined between the connection hole 107 and another adjacent connection hole 107.

The second through-hole 109 may minimize the problem of deformation due to overheating of the bracket 100 by dispersing the heat transfer to the member forming the bracket, such as the outer bridge 114.

In some implementations, the second through-hole 109 may not be defined between the connection hole 107 and another adjacent connection hole 107.

Figure 16:
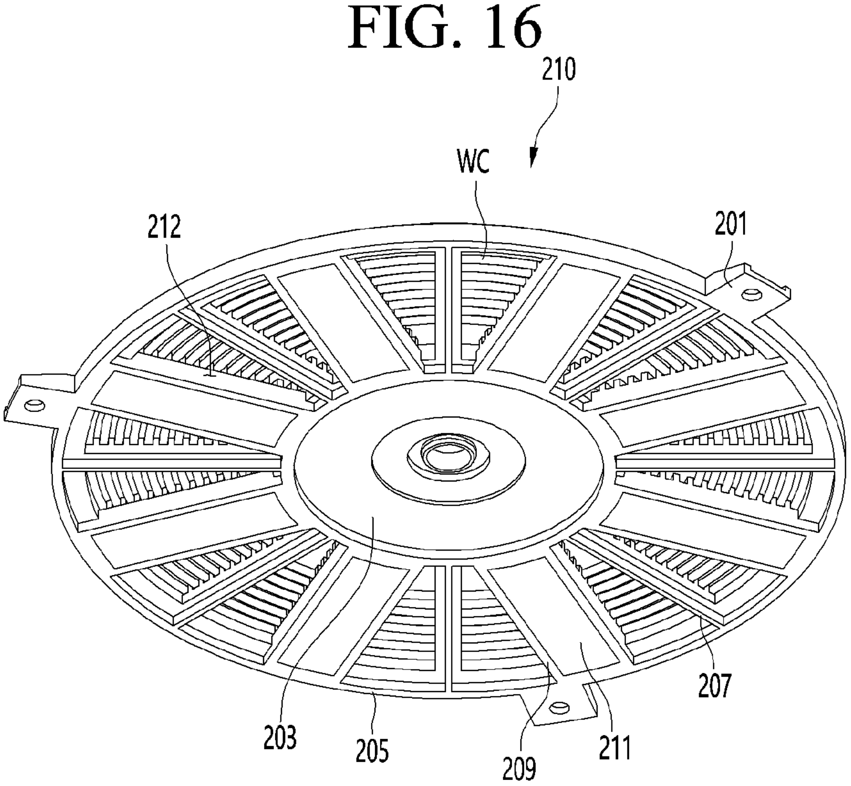
FIG. 16 is a view showing an example of a working coil supporter provided in the induction heating type cooktop.
Figure 17:
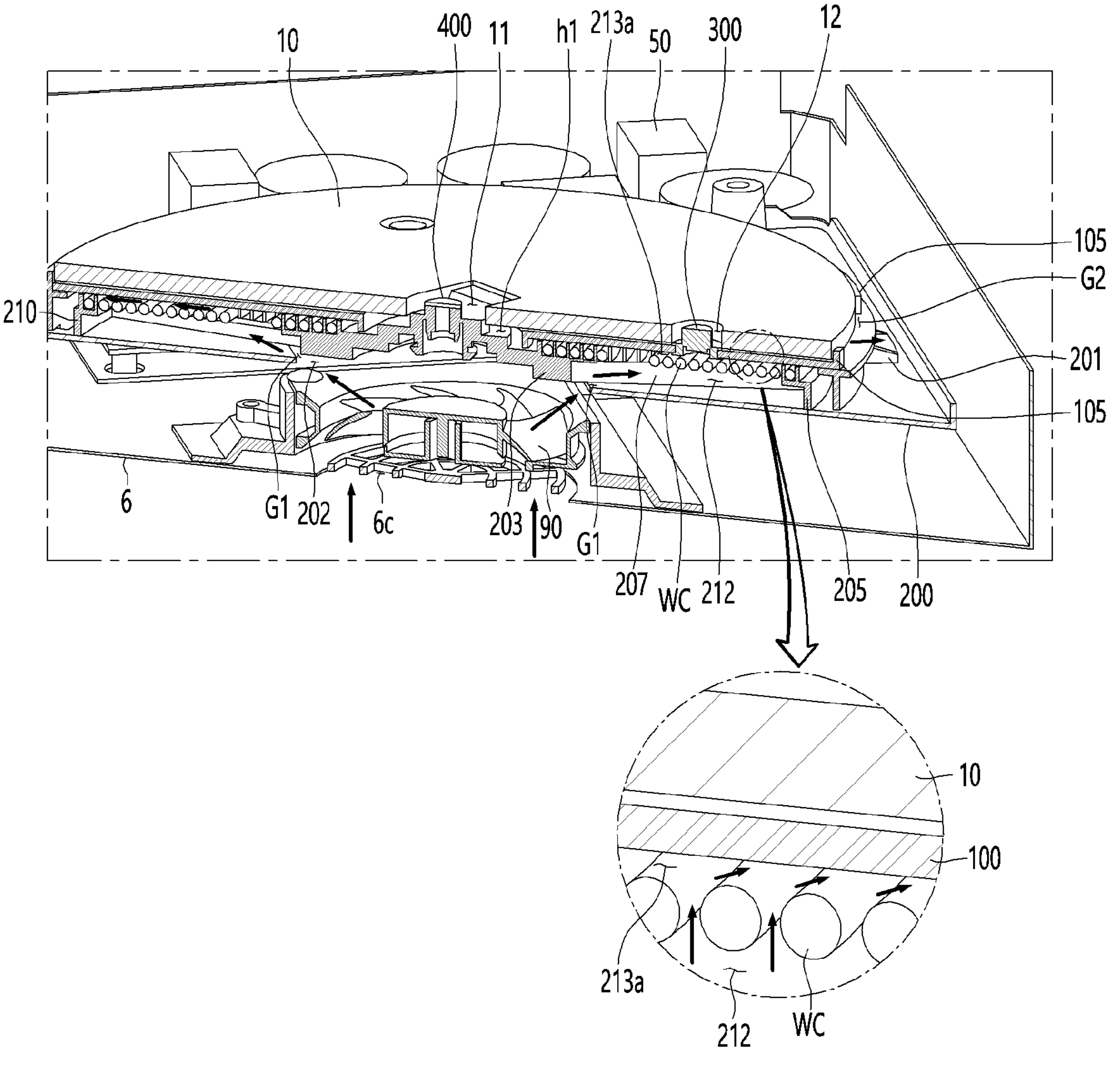
FIGS. 17 and 18 are cross-sectional views showing examples of cooling passages defined in the bracket.
Figure 18:
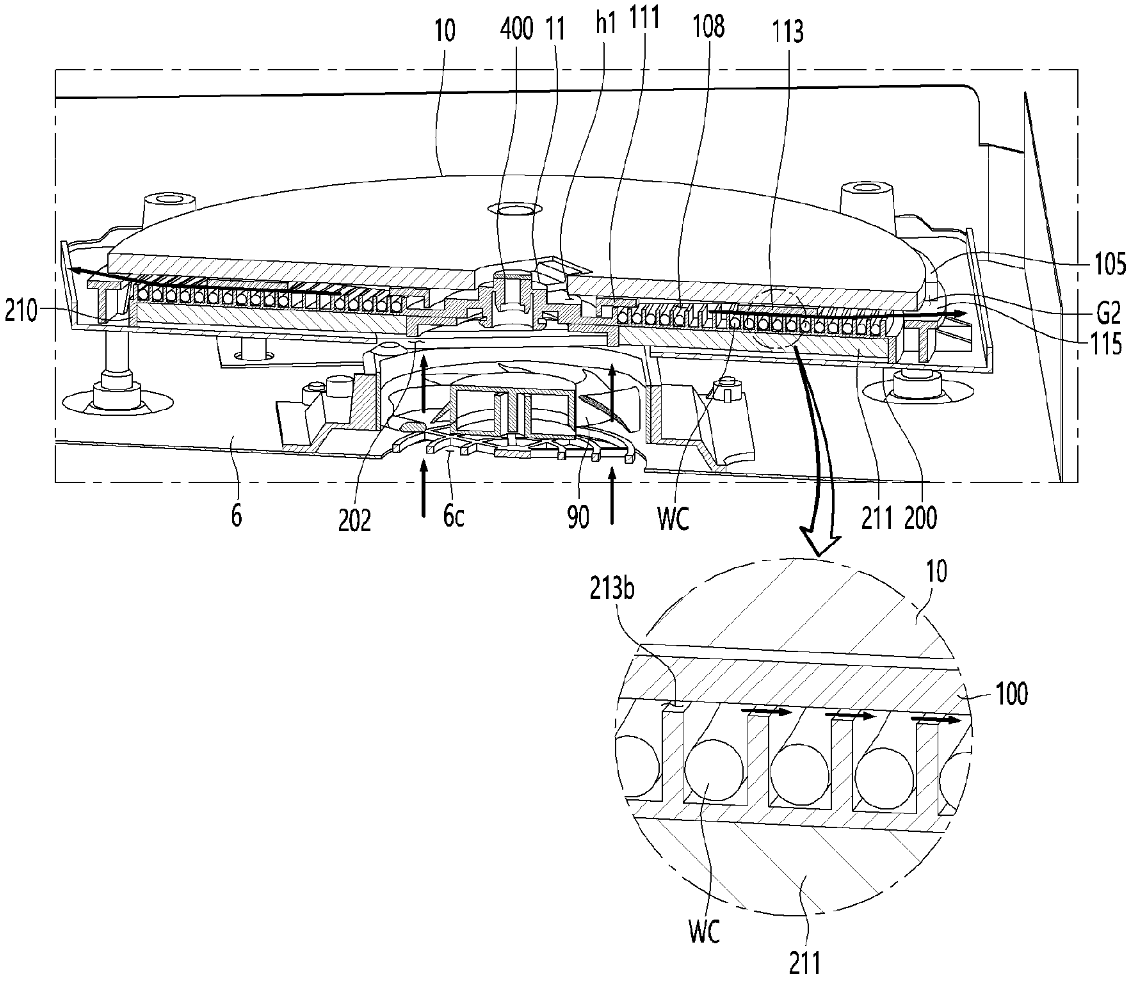

FIG. 16 is a view showing an example working coil supporter provided in the induction heating type cooktop, and FIGS. 17 and 18 are cross-sectional views showing example cooling passages defined in the bracket.

The working coil supporter 210 may include an inner supporter 203, an outer supporter 205, and middle supporters 207 and 209.

The inner supporter 203 may support the working coil WC wound inside the working coil supporter 210. The outer supporter 205 may form an outer circumference of the working coil supporter 210 and may support the working coil WC wound along the outer circumference of the working coil supporter 210.

The middle supporters 207 and 209 may connect the inner supporter 203 to the outer supporter 205 and may support the working coil WC wound between the inner supporter 203 and the outer supporter 205. A ferrite 211 may be disposed on at least one (e.g., 209) of the middle supporters 207 and 209.

The ferrite 211 may prevent the magnetic field generated in the working coil WC from flowing to the lower side. The ferrite 211 may be formed of a material having a very high permeability.

As shown in the example shown in FIG. 16, the middle supporter 207 in which the ferrite 211 is not disposed and the middle supporter 209 in which the ferrite 211 is disposed may be alternately formed along a circle. An air space 212 may be defined between the middle supporters 207 and 209.

The air space 212 may be a space into which air blown by the working coil cooling fan 90 is introduced.

In detail, as shown in FIG. 17, the cooling passage inlet G1 may be defined between the inner supporter 203 and the base plate 200. Air suctioned from the outside by the working coil cooling fan 90 may be introduced into the air space 212 through the base hole 202 and the cooling passage inlet G1.

The air introduced into the air space 212 may pass between the working coils WC and move to a first gap 213*a* between the bracket 100 and the working coil WC.

Gaps 213*a* and 213*b* may be defined between the bracket 100 and the working coil WC. The gaps 213*a* and 213*b* may be divided into the first gap 213*a* defined at a position overlapping the air space 212 in the vertical direction and the second gap 213*b* defined at a position overlapping the ferrite 211 in the vertical direction.

The air introduced into the first gap 213*a* through the air space 212 may move in the horizontal direction. Therefore, the air introduced into the first gap 213*a* may move to the second gap 213*b*. In contrast, the air in the second gap 213*b* may move back to the first gap 213*a*. That is, the air introduced into the gaps 213*a* and 213*b* may move freely in the horizontal direction. Then, at least part of the air introduced in the second gap 213*b* may be exhausted to the outside of the bracket 100 through the cooling passage outlet G2.

That is, in order to cool the working coil WC, the air blown from the outside by the working coil cooling fan 90 may flow along the cooling passage inlet G1, the air space 212, the first gap 213*a*, the second gap 213*b*, and the cooling passage outlet G2. The cooling passage defined in the bracket 100 may include the cooling passage outlet G2 and the gaps 213*a* and 213*b* between the bracket 100 and the working coil WC.

As described above, the air blown by the working coil cooling fan 90 may pass through the working coil WC and be exhausted to cool the working coil WC. That is, in the induction heating type cooktop 1, the heat insulator 10 is installed and the cooling passage passing through the working coil WC is also formed, thereby minimizing overheating of the working coil WC from the heat generated as the thin layer TL is heated.

In some examples, where the thin layer TL coated on the upper plate part 4 has a structure that is directly heated by the working coil WC, the thin layer TL may be heated to reach a very high temperature close to about 600° C. As described above, when the thin layer TL is overheated, there is a risk of damage to the upper plate part 4 on which the thin layer TL is disposed. Therefore, in order to minimize the risk of damage to the upper plate part 4, the temperature of the thin layer TL may be monitored such that the temperature of the thin layer TL is maintained below a set temperature.

To this end, the induction heating type cooktop 1 may further include a thin layer temperature sensor 300 configured to sense the temperature of the thin layer TL. The induction heating type cooktop 1 may include at least one thin layer temperature sensor 300. In addition, the induction heating type cooktop 1 may include an upper plate part temperature sensor 400 configured to sense the temperature of the upper plate part 4. A temperature sensor, which will be described below, includes the thin layer temperature sensor 300 and the upper plate part temperature sensor 400.

In order to minimize the problem of damage to the upper plate part 4 due to the rapid temperature rise of the thin layer TL, the temperature sensors 300 and 400 have to be provided with a sensor having a fast reaction speed and capable of measuring a temperature close to about 600° C.

In some implementations, the temperature sensors 300 and 400 may be temperature sensors configured to measure a temperature by using a thermocouple.

The temperature sensors 300 and 400 may include a plurality of thermocouples. The plurality of thermocouples may include a first end connecting to or contacting a portion where a temperature is measured and a second end for transferring the measured information to the control module.

The temperature sensors 300 and 400 may include some of various types of thermocouples. In some implementations, the thermocouples used in the temperature sensors 300 and 400 may be K-type thermocouples. The temperature sensors 300 and 400 may measure electromotive force generated by measuring the temperature (e.g., a Seebeck voltage caused by a temperature difference between dissimilar metals). The electromotive force and the temperature measured through the thermocouple may be in a correspondence relationship with each other, and data about the correlation between the electromotive force and the temperature may be stored in advance.

The induction heating type cooktop 1 may calculate the temperature based on the electromotive force measured through the thermocouple. A conventional temperature sensor, such as a thermistor type, has slow reactivity and has a limitation that a maximum measurable temperature is about 300° C. or less. Therefore, when the induction heating type cooktop 1 is provided with a thermocouple thermometer as the temperature sensors 300 and 400, the reaction speed is improved compared with a conventional temperature sensor (e.g., a thermistor), and measurement of a relatively high temperature (about 600° C.) is possible. For example, the induction heating type cooktop 1 may determine whether the temperature rises within a range of at least 600° C. through the temperature sensors 300 and 400. That is, the induction heating type cooktop 1 may be measurable to at least a guaranteed temperature (e.g., about 550° C.) of a manufacturer of the upper plate part 4 through the temperature sensors 300 and 400.

The temperature sensors 300 and 400 may be configured to measure the temperature of at least one of the thin layer TL or the upper plate part 4 by using a plurality of thermocouples disposed to measure the temperature of a portion where a temperature above a predetermined temperature is distributed in a temperature distribution by the inductively heated thin layer TL. A first end of each of the plurality of thermocouples may be disposed on at least one of the thin layer TL or the upper plate part 4 so as to measure the heating temperature caused by the inductively heated thin layer TL.

First, since the first end has to be installed to connect to or contact the thin layer TL, the thin layer temperature sensor 300 may be installed such that the first end is disposed directly under the thin layer TL. That is, the thin layer temperature sensor 300 may be installed such that the first end is disposed between the thin layer TL and the working coil WC. In particular, since the thin layer temperature sensor 300 has to measure the temperature of the area with the highest temperature in the thin layer TL, the first end may be disposed in an area in which the working coil WC is densely disposed in the space between the thin layer TL and the working coil WC.

In some examples, a narrow gap (e.g., about 7 mm) may be defined between the upper plate part 4 coated with the thin layer TL and the working coil WC, and an installation space of the thin layer temperature sensor 300 may be limited. Therefore, the cooktop 1 may include a structure to install the thin layer temperature sensor 300 in a narrow space between the upper plate part 4 and the working coil WC.

In some implementations, the thin layer temperature sensor 300 may be installed to be fixed to the bracket 100. That is, the thin layer temperature sensor 300 may be installed such that the first end connecting to or contacting the thin layer TL is fixed to the bracket 100.

Figure 19:
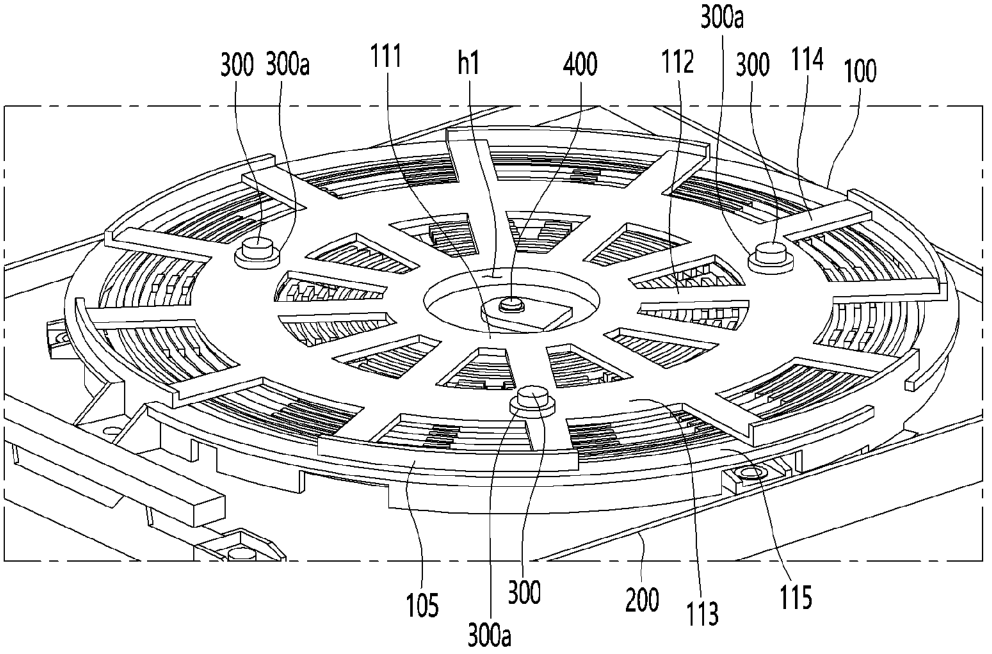
FIG. 19 is a view showing an example of a thin layer temperature sensor provided in an example induction heating type cooktop.
Figure 20:
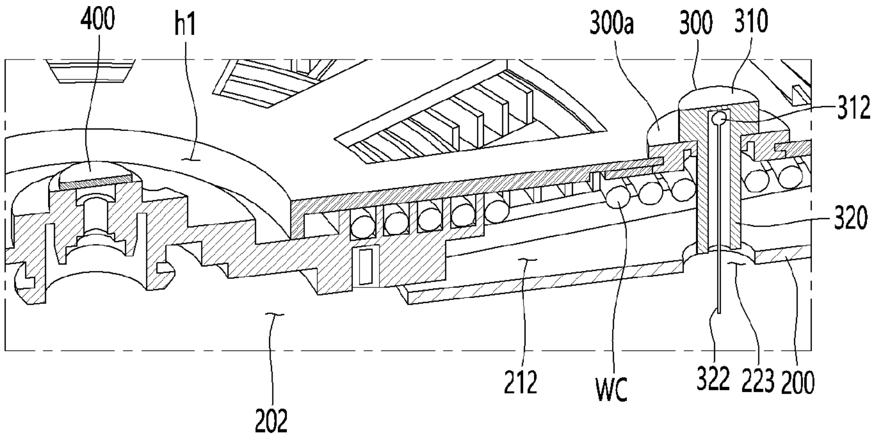
FIG. 20 is a view showing an example of a wire of the thin layer temperature sensor shown in FIG. 19.
Figure 21:
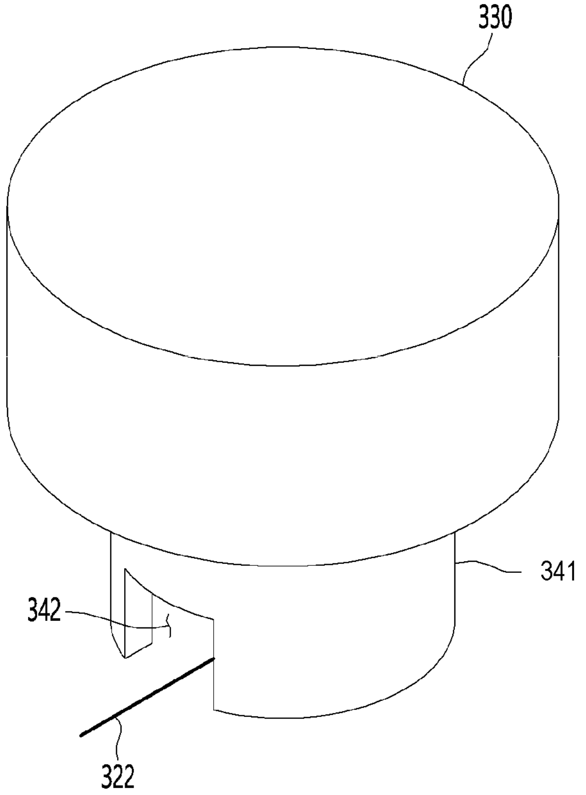
FIGS. 21 and 22 are views showing examples of a wire of the thin layer temperature sensor shown in FIG. 19.
Figure 22:
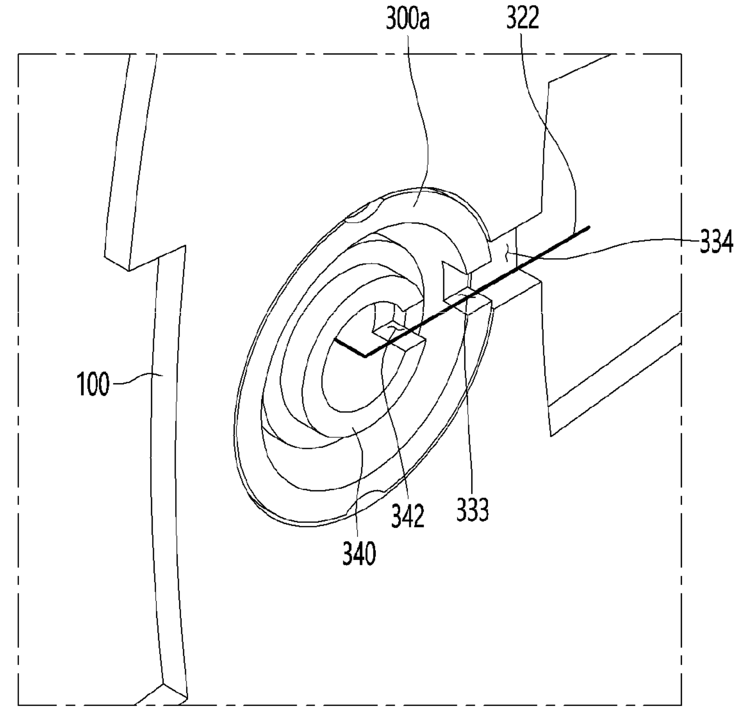

FIG. 19 is a view showing an example of a thin layer temperature sensor provided on an example induction heating type cooktop. FIG. 20 is a view showing an example of a wire of the thin layer temperature sensor shown in FIG. 19. FIGS. 21 and 22 are views showing examples of a wire of the thin layer temperature sensor shown in FIG. 19.

The second sensor hole h2 through which the thin layer temperature sensor 300 passes may be defined in the bracket 100, and the thin layer temperature sensor 300 may be installed to pass through the second sensor hole h2. That is, the first end 312 of the thin layer temperature sensor 300 may pass through the second sensor hole h2 and connect to or contact the thin layer TL.

At least one second sensor hole h2 may be defined in, for example, the middle member 113 of the bracket 100. However, this is merely an example, and the second sensor hole h2 may be defined at any position of the bracket 100, such as the inner member 111, the inner bridge 112, the outer bridge 114, or the outer member 115.

Referring to the example of FIG. 19, a plurality of second sensor holes h2 may be defined in the bracket 100, and the plurality of second sensor holes h2 may be spaced apart at equal intervals.

The thin layer temperature sensor 300 may be installed in each of the second sensor holes h2. A sealing member 300*a* configured to pack a space remaining when the thin layer temperature sensor 300 is installed may be further installed. The sealing member 300*a* may be made of a material such as silicone or rubber and may shield the second sensor hole h2.

The sealing member 300*a* may block heat transfer in the vertical direction of the bracket 100 through the second sensor hole h2. For example, the sealing member 300*a* may block the heat generated from the thin layer TL or the like from being transferred to the working coil WC through the second sensor hole h2.

In some examples, the thin layer temperature sensor 300 may be provided with head parts 310 and 330 in which the first end 312 is accommodated, and connectors 320 and 341 in which at least part of the wire 322 for transferring a sensing value of the first end 312 to a control module is accommodated.

The head parts 310 and 330 may be disposed to connect to or contact the thin layer TL. The head parts 310 and 330 may pass through the second sensing hole 12 defined in the heat insulator 10, and the upper surfaces of the head parts 310 and 330 may connect to or contact the thin layer TL.

The connectors 320 and 341 may be formed such that the wire 322 passes between the working coils WC or passes over the working coils WC and connects to the control module.

In some implementations, as shown in FIG. 20, the thin layer temperature sensor 300 may be formed such that the wire 322 passes between the working coils WC wound around the working coil supporter 210. In this case, the wire 322 may pass between the working coils WC and the air space 212 and may pass through a wire hole 223 defined in the base plate 200.

The connector 320 may be formed from the head part 310 to the wire hole 223 as shown in FIG. 20. However, this is merely an example, and the connector 320 may be formed only from the head part 310 to the working coils WC or from the head part 310 to the upper end of the working coil WC.

In some implementations, as shown in FIGS. 21 and 22, the thin layer temperature sensor 300 may be formed such that the wire 322 passes over the working coils WC wound around the working coil supporter 210.

A wire passage 342 configured to guide the wire 322 in the horizontal direction may be defined in the connector 341. That is, the wire 322 connected to the first end 312 accommodated in the head part 330 may be bent at the connector 341, pass through the wire passage 342, and then pass over the working coils WC. As described above, when the wire passage 342 is defined in the connector 341, an operator may easily recognize an assembly direction of the connector 341 through a position at which the wire passage 342 is defined.

In some implementations, wire passages 333 and 334 through which the wire 322 passes may be defined in at least one of the sealing member 300*a* or the bracket 100.

In some implementations, since the thin layer temperature sensor 300 is fixed to the bracket 100 between the temperature measurement point and the working coil WC, the installation space of the thin layer temperature sensor 300 may be minimized and the temperature of the thin layer TL may be stably measured.

In some implementations, the thin layer temperature sensor 300 may be installed to be fixed to the working coil supporter 210. That is, the thin layer temperature sensor 300 may be installed such that the first end connecting to or contacting the thin layer TL is fixed and supported by the working coil supporter 210.

In some implementations, the thin layer temperature sensor 300 may be installed to be fixed to the base plate 200. That is, the thin layer temperature sensor 300 may be installed such that the first end connecting to or contacting the thin layer TL is fixed and supported by the base plate 200.

Figure 23:
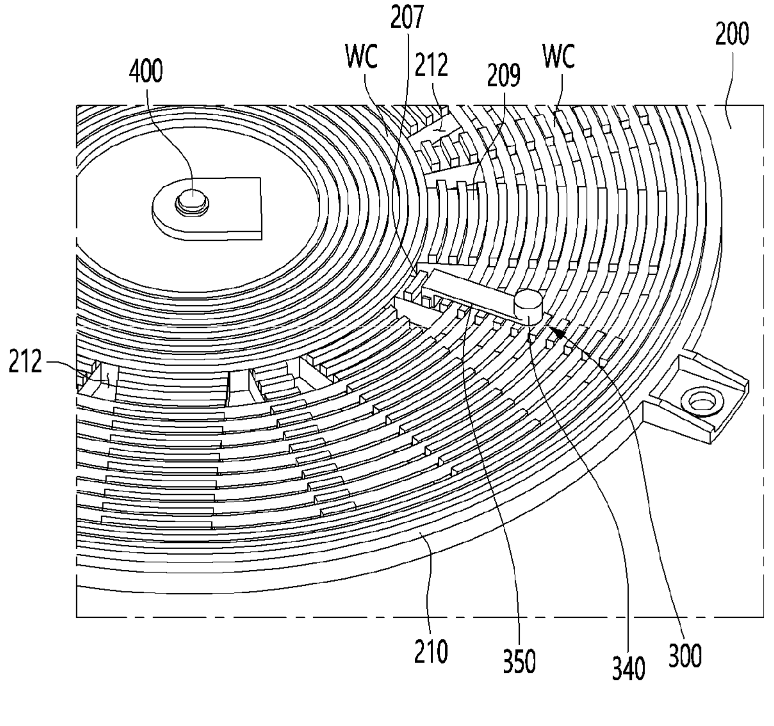
FIG. 23 is a view showing an example of a thin layer temperature sensor provided in an example induction heating type cooktop.
Figure 24:
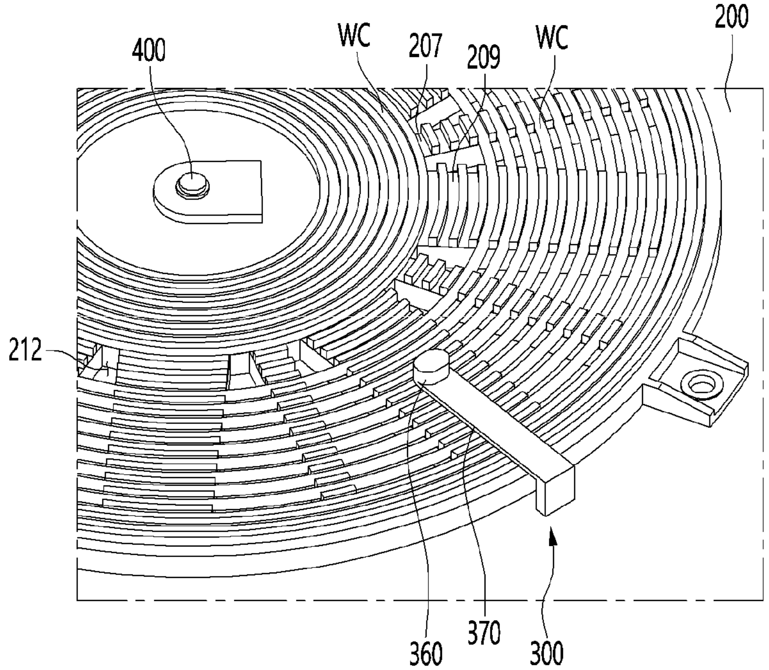
FIG. 24 is a view showing an example of a thin layer temperature sensor provided in an example induction heating type cooktop.
Figure 25:
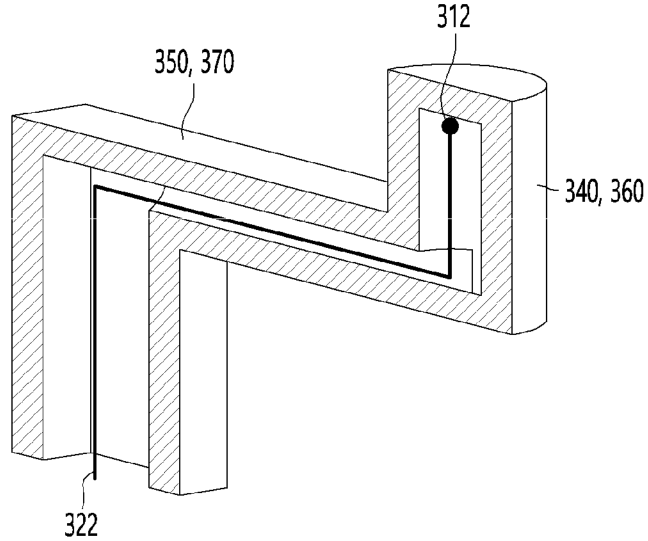
FIG. 25 is a longitudinal sectional view of the thin layer temperature sensors shown in FIGS. 23 and 24.

FIG. 23 is a view showing an example of a thin layer temperature sensor provided in an example induction heating type cooktop, FIG. 24 is a view showing an example of a thin layer temperature sensor provided in an example induction heating type cooktop, and FIG. 25 is a longitudinal sectional view of the thin layer temperature sensors shown in FIGS. 23 and 24.

In some examples, the thin layer temperature sensor 300 may be installed to be fixed to the working coil supporter 210 as shown in FIG. 23. In some examples, the thin layer temperature sensor 300 may be fixed to the base plate 200 as shown in FIG. 24. For instance, the point at which the thin layer temperature sensor 300 is fixed may be spaced apart from the head parts 340 and 360 in which the first end 312, which is the temperature measurement point, is accommodated.

Referring to FIG. 23, in the thin layer temperature sensor 300, the head part 340 in which the first end 312 is accommodated may be located on the working coil WC, and the connector 350 connected to the lower end of the head part 340 may be installed to be fixed to the middle supporters 207 and 209. In particular, the connector 250 may be fixed to the middle supporter 207 in which the ferrite 211 is not disposed. The connector 350 may be formed in the horizontal direction from the lower end of the head part 340 to the middle supporter 207 in which the working coil WC is not wound. The connector 350 may be bent once or more times so as to be fixed to the middle supporter 207.

Referring to FIG. 24, in the thin layer temperature sensor 300, the head part 360 in which the first end 312 is accommodated may be located on the working coil WC, and the connector 370 connected to the lower end of the head part 360 may be installed to be fixed to the base plate 200. The connector 370 may be formed in the horizontal direction from the lower end of the head part 360 to the base plate 200. The connector 370 may be bent once or more times so as to be fixed to the base plate 200.

As shown in FIG. 23 or FIG. 24, when the thin layer temperature sensor 300 is installed to be fixed to the working coil supporter 210 or the base plate 200, there is an advantage that the thin layer temperature sensor 300 may be fixed even when a separate member such as the bracket 100 is not added. That is, an empty area of the working coil supporter 210 or an empty area of the base plate 200 is utilized such that the thin layer temperature sensor 300 is mounted.

In some examples, the upper plate part temperature sensor 400 may be installed such that the first end connects to or contacts the upper plate part 4.

In some implementations, the upper plate part temperature sensor 400 may be fixed to the working coil supporter 210. In detail, the upper plate part temperature sensor 400 may be installed such that the first end is disposed at the center of the working coil supporter 210, and the first end may pass through the first sensor hole h1 of the bracket 100 and the first sensing hole 11 of the heat insulator 10 and connect to or contact the upper plate part 4.

The above description is merely illustrative of the technical idea of the present disclosure, and various modifications and changes may be made thereto by those skilled in the art without departing from the essential characteristics of the present disclosure.

Therefore, the implementations of the present disclosure are not intended to limit the technical spirit of the present disclosure but to illustrate the technical idea of the present disclosure, and the technical spirit of the present disclosure is not limited by these implementations.

The scope of protection of the present disclosure should be interpreted by the appending claims, and all technical ideas within the scope of equivalents should be construed as falling within the scope of the present disclosure.

What is claimed is:

1. An induction heating cooktop comprising:
- a case;
- a cover plate connected to an upper end of the case, the cover plate having an upper surface configured to support thereon an object to be heated;
- a working coil disposed inside the case;
- a thin layer disposed at the cover plate and configured to be heated by the working coil by induction;
- a heat insulator disposed vertically below the thin layer;
- a cooling fan configured to blow air toward the working coil; and
- a bracket that is disposed above the working coil and defines a cooling passage, the cooling passage being configured to guide the air to pass through the working coil and to discharge the air to an outside of the bracket,
- wherein the cooling passage is configured to discharge the air having passed through the working coil to the outside of the bracket through a gap defined between a bottom of the bracket and a top of the working coil, and
- wherein the thin layer is thinner than a predetermined skin depth of the thin layer.

2. The induction heating cooktop according to claim 1, wherein the heat insulator is disposed on the bracket.

3. The induction heating cooktop according to claim 1, wherein the bracket comprises a guide part that is configured to fix the heat insulator to the bracket and to restrict movement of the heat insulator in a horizontal direction.

4. The induction heating cooktop according to claim 3, wherein the guide part comprises a plurality of guide members that are spaced apart from one another and that are arranged along a circumferential direction of the bracket, and
- wherein the cooling passage has a cooling passage outlet that is defined between two of the plurality of guide members and configured to discharge the air through the cooling passage.

5. The induction heating cooktop according to claim 1, further comprising:
- a working coil supporter, the working coil being wound around the working coil supporter; and
- a base plate that supports the working coil supporter,
- wherein the cooling passage has a cooling passage inlet that is defined between the working coil supporter and the base plate and that is configured to receive the air blown by the cooling fan.

6. The induction heating cooktop according to claim 5, wherein the working coil supporter defines an air space configured to receive the air passing through the cooling passage inlet.

7. The induction heating cooktop according to claim 6, wherein the gap defined between the bracket and the working coil is configured to receive the air passing through the air space of the working coil supporter.

8. The induction heating cooktop according to claim 7, wherein the bracket defines a cooling passage outlet configured to discharge the air passing through the gap to the outside of the bracket.

9. The induction heating cooktop according to claim 8, wherein the bracket further defines a connection hole that is in communication with the cooling passage outlet.

10. The induction heating cooktop according to claim 1, wherein the bracket defines at least one through-hole configured to discharge heat from the thin layer.

11. The induction heating cooktop according to claim 1, further comprising a temperature sensor that is disposed at the bracket and configured to sense a temperature of the thin layer.

12. The induction heating cooktop according to claim 1, further comprising a temperature sensor configured to sense a temperature of the cover plate or the thin layer,
- wherein the bracket defines at least one sensor hole that receives the temperature sensor.

13. The induction heating cooktop according to claim 12, wherein the heat insulator defines a sensing hole, at least a portion of the sensing hole overlapping with the at least one sensor hole in a horizontal direction.

14. The induction heating cooktop according to claim 1, further comprising a first temperature sensor configured to sense a temperature of the cover plate, wherein the bracket defines a first sensor hole that is disposed at a center of the bracket and that receives the first temperature sensor, and wherein the thin layer is coated on an area of the cover plate corresponding to an outside region of the first sensor hole in the bracket.

15. The induction heating cooktop according to claim 14, further comprising a second temperature sensor configured to sense a temperature of the thin layer, wherein the bracket further defines a second sensor hole that receives the second temperature sensor, and wherein the thin layer is coated on an area of the cover plate corresponding to the second sensor hole in the bracket.

16. The induction heating cooktop according to claim 1, wherein the bracket comprises:

an inner member that defines a first sensor hole;

a middle member that is disposed outward relative to the inner member and that defines a second sensor hole;

an outer member that is disposed outward relative to the middle member;

an inner bridge that connects the inner member to the middle member; and an outer bridge that connects the middle member to the outer member, wherein at least one of the inner bridge or the outer bridge defines a through-hole.

17. The induction heating cooktop according to claim 16, wherein the inner bridge comprises a plurality of bridge members that connect the inner member to the middle member, and wherein the through-hole is defined between two of the plurality of bridge members.

18. The induction heating cooktop according to claim 1, further comprising a working coil supporter, the working coil being wound around the working coil supporter, wherein the bracket is disposed between the working coil supporter and the heat insulator.

19. The induction heating cooktop according to claim 1, wherein the working coil is configured to:

based on a magnetic object being disposed on the upper surface of the cover plate, apply current through a first equivalent circuit comprising a resistor component of the magnetic object, an inductor component of the magnetic object, a resistor component of the thin layer, and an inductor component of the thin layer; and based on a nonmagnetic object being disposed on the upper surface of the cover plate, apply current through a second equivalent circuit comprising the resistor component of the thin layer and the inductor component of the thin layer, and wherein the resistor component of the thin layer and the inductor component of the thin layer define an electrical impedance in the thin layer.

20. The induction heating cooktop according to claim 1, wherein the working coil is configured generate a magnetic field to heat the object disposed on the upper surface of the cover plate by inducing an eddy current in the object by the magnetic field that passes through the thin layer.

21. The induction heating cooktop according to claim 1, wherein the cooling passage includes:

a cooling passage inlet disposed below the working coil; and a cooling passage outlet disposed radially outside the working coil, and wherein the gap overlaps the thin layer in a vertical direction.

22. The induction heating cooktop according to claim 21, wherein the gap includes:

a first gap defined at an upper side of the working coil;

a second gap defined at a lower side of the working coil; and a third gap defined between the first gap and the second gap, wherein the first gap, the second gap, and the third gap surround a circumference of the working coil, wherein an opening is defined in a lower portion of the case, and wherein the cooling fan is configured to suction air from an outside of the case through the opening such that the suctioned air passes through the first, second, and third gaps in the vertical direction and a horizontal direction.

* * * * *